United States Patent
Ghosh et al.

(10) Patent No.: US 10,834,689 B2
(45) Date of Patent: Nov. 10, 2020

(54) BASE STATION WIRELESS CHANNEL SOUNDING

(71) Applicant: AT&T Intellectual Property I, L.P., Atlanta, GA (US)

(72) Inventors: Arunabha Ghosh, Austin, TX (US); Ralf Bendlin, Cedar Park, TX (US); Saeed Ghassemzadeh, Austin, TX (US); Thomas Novlan, Austin, TX (US); Salam Akoum, Austin, TX (US); SaiRamesh Nammi, Austin, TX (US); Xiaoyi Wang, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 258 days.

(21) Appl. No.: 15/678,071

(22) Filed: Aug. 15, 2017

(65) Prior Publication Data
US 2019/0059064 A1   Feb. 21, 2019

(51) Int. Cl.
*H04W 56/00* (2009.01)
*H04W 24/08* (2009.01)
(Continued)

(52) U.S. Cl.
CPC ....... *H04W 56/0005* (2013.01); *H04L 5/0048* (2013.01); *H04W 24/08* (2013.01); *H04L 5/0091* (2013.01); *H04W 64/00* (2013.01)

(58) Field of Classification Search
None
See application file for complete search history.

(56) References Cited

U.S. PATENT DOCUMENTS

| 6,236,363 B1 * | 5/2001 | Robbins | ................. H01Q 3/267 342/169 |
| 6,269,092 B1 | 7/2001 | Schilling | |

(Continued)

FOREIGN PATENT DOCUMENTS

| CN | 104507108 A | 4/2015 |
| EP | 2819454 A1 | 12/2014 |

(Continued)

OTHER PUBLICATIONS

Ayman Elnashar et al., "Looking at LTE in practice: A performance analysis of the LTE system based on field test results", IEEE Vehicular Technology Magazine vol. 8, Issue 3 (2013). pp. 81-92. https://www.researchgate.net/profile/Ayman_Elnashar/publication/260654677_Looking_at_LTE_in_Practice_A_Performance_Analysis_of_the_LTE_System_Based_on_Field_Test_Results/links/56b0ad0008ae9ea7c3ble552.pdf.

(Continued)

*Primary Examiner* — Edan Orgad
*Assistant Examiner* — Emmanuel K Maglo

(57) ABSTRACT

A method may include a processing system of a channel sounding receiver having a processor detecting a synchronization signal within a time and frequency resource grid of a base station and measuring a channel property at a first location based upon the synchronization signal that is received at the first location. The method may further include the processing system receiving at a second location, from the base station, the synchronization signal, measuring a channel property at the second location based upon the synchronization signal that is received at the second location, and selecting between the first location and the second location for a deployment of a customer premises equipment based upon the channel property at the first location and the channel property at the second location.

15 Claims, 9 Drawing Sheets

(51) Int. Cl.
*H04L 5/00* (2006.01)
*H04W 64/00* (2009.01)

(56) References Cited

U.S. PATENT DOCUMENTS

| | | | |
|---|---|---|---|
| 6,711,204 B2 | 3/2004 | Schilling | |
| 7,515,916 B1* | 4/2009 | Alexander | H04W 24/08 345/582 |
| 8,179,824 B2 | 5/2012 | Seong et al. | |
| 8,289,863 B2 | 10/2012 | Vook et al. | |
| 8,295,859 B1* | 10/2012 | Yarkan | H04L 27/0006 455/456.6 |
| 8,351,411 B2 | 1/2013 | Kim et al. | |
| 8,463,298 B2 | 6/2013 | Kim et al. | |
| 8,531,937 B2 | 9/2013 | Levy | |
| 8,565,673 B2 | 10/2013 | Hu | |
| 8,599,945 B2 | 12/2013 | Sampath | |
| 8,655,348 B2 | 2/2014 | Zha et al. | |
| 8,660,015 B2 | 2/2014 | Issakov et al. | |
| 8,675,575 B2 | 3/2014 | Gong et al. | |
| 8,681,727 B2 | 3/2014 | Kinnunen et al. | |
| 8,873,408 B2 | 10/2014 | Siomina et al. | |
| 8,971,294 B2 | 3/2015 | Yan et al. | |
| 8,995,563 B2 | 3/2015 | Cho et al. | |
| 9,124,395 B2 | 9/2015 | Lin et al. | |
| 9,258,040 B2 | 2/2016 | Levy | |
| 9,264,928 B2 | 2/2016 | Liu et al. | |
| 9,270,438 B2 | 2/2016 | Lee et al. | |
| 9,295,044 B2 | 3/2016 | Novak et al. | |
| 9,300,495 B2 | 3/2016 | Dahlman et al. | |
| 9,332,443 B2 | 5/2016 | Xiao et al. | |
| 9,351,288 B2 | 5/2016 | Pi | |
| 9,351,315 B2 | 5/2016 | Bao et al. | |
| 9,414,371 B2 | 8/2016 | Pi et al. | |
| 9,420,584 B2 | 8/2016 | Blankenship et al. | |
| 9,439,086 B2 | 9/2016 | Emmanuel et al. | |
| 9,444,531 B2 | 9/2016 | Levy | |
| 9,444,596 B2 | 9/2016 | Chung et al. | |
| 9,455,772 B2 | 9/2016 | Zhang et al. | |
| 9,473,226 B2 | 10/2016 | Shattil | |
| 9,473,967 B2 | 10/2016 | Zhang et al. | |
| 9,496,609 B2 | 11/2016 | Marshall et al. | |
| 9,497,047 B2 | 11/2016 | Josiam et al. | |
| 9,510,314 B2 | 11/2016 | Schmidt et al. | |
| 9,537,623 B2 | 1/2017 | Zhang | |
| 9,629,122 B2 | 4/2017 | Yoon et al. | |
| 9,629,171 B2 | 4/2017 | Roy et al. | |
| 9,635,579 B2 | 4/2017 | Wang et al. | |
| 9,654,236 B2 | 5/2017 | Jeong et al. | |
| 9,730,151 B2 | 8/2017 | Jia et al. | |
| 9,885,774 B2* | 2/2018 | Kumar | G01S 5/0215 |
| 2009/0080504 A1* | 3/2009 | Li | H04B 7/0421 375/220 |
| 2009/0274226 A1 | 11/2009 | Mondal et al. | |
| 2010/0080311 A1* | 4/2010 | Moffatt | H04L 25/022 375/260 |
| 2011/0117926 A1* | 5/2011 | Hwang | H04W 64/00 455/456.1 |
| 2011/0222507 A1* | 9/2011 | Lee | H04W 28/26 370/330 |
| 2012/0027140 A1* | 2/2012 | Weng | H04L 25/0232 375/350 |
| 2012/0155516 A1* | 6/2012 | Kim | H04L 25/0206 375/219 |
| 2013/0094488 A1* | 4/2013 | Choi | H04W 16/28 370/338 |
| 2013/0242974 A1* | 9/2013 | Li | H04W 56/00 370/350 |
| 2013/0290525 A1 | 10/2013 | Fedor et al. | |
| 2013/0322363 A1* | 12/2013 | Chen | H04W 72/042 370/329 |
| 2014/0146732 A1 | 5/2014 | Olufunmilola et al. | |
| 2014/0204782 A1* | 7/2014 | Geirhofer | H04B 7/024 370/252 |
| 2014/0321314 A1 | 10/2014 | Fodor et al. | |
| 2014/0349645 A1* | 11/2014 | Webb | H04L 5/0091 455/435.1 |
| 2015/0085833 A1* | 3/2015 | Han | H04J 11/0069 370/336 |
| 2015/0134419 A1 | 5/2015 | Kandasamy et al. | |
| 2015/0163271 A1 | 6/2015 | Handurukande et al. | |
| 2015/0208392 A1* | 7/2015 | Park | H04B 7/024 370/329 |
| 2015/0257121 A1 | 9/2015 | Siomina et al. | |
| 2015/0373637 A1 | 12/2015 | Wang et al. | |
| 2016/0080121 A1* | 3/2016 | Kim | H04L 5/005 370/329 |
| 2016/0119902 A1 | 4/2016 | Cheong et al. | |
| 2016/0127006 A1 | 5/2016 | Majjigi et al. | |
| 2016/0173259 A1 | 6/2016 | Lee et al. | |
| 2016/0204910 A1 | 7/2016 | Kim et al. | |
| 2016/0262051 A1* | 9/2016 | Merlin | H04B 7/0643 |
| 2016/0269157 A1 | 9/2016 | Soriaga et al. | |
| 2016/0269158 A1 | 9/2016 | Soriaga et al. | |
| 2016/0270087 A1 | 9/2016 | Soriaga et al. | |
| 2016/0337872 A1 | 11/2016 | Alrabadi et al. | |
| 2016/0380732 A1 | 12/2016 | Chung et al. | |
| 2017/0026156 A1 | 1/2017 | Thomas et al. | |
| 2017/0064518 A1 | 3/2017 | Kim et al. | |
| 2017/0094676 A1 | 3/2017 | Kim et al. | |
| 2017/0099127 A1 | 4/2017 | Byun et al. | |
| 2017/0141823 A1 | 5/2017 | Fodor et al. | |
| 2017/0223655 A1 | 8/2017 | Huang et al. | |
| 2017/0223690 A1 | 8/2017 | Zang et al. | |
| 2017/0238268 A1 | 8/2017 | Yang et al. | |
| 2017/0353234 A1* | 12/2017 | Islam | H04W 56/0015 |
| 2018/0014268 A1* | 1/2018 | Kuppusamy | H04L 27/266 |
| 2018/0035454 A1* | 2/2018 | Vitthaladevuni | H04L 5/0048 |
| 2018/0049014 A1* | 2/2018 | Patil | H04L 5/0051 |
| 2018/0049113 A1* | 2/2018 | Jung | H04L 5/0048 |
| 2018/0054821 A1* | 2/2018 | Sun | H04W 16/14 |
| 2018/0205589 A1* | 7/2018 | Bai | H04L 5/0035 |
| 2018/0227148 A1* | 8/2018 | Chatterjee | H04L 5/005 |
| 2018/0248736 A1* | 8/2018 | Davydov | H04B 7/024 |
| 2018/0351611 A1* | 12/2018 | Nagaraja | H04B 7/0417 |

FOREIGN PATENT DOCUMENTS

| | | |
|---|---|---|
| EP | 3120601 A1 | 1/2017 |
| KR | 20170057853 A | 5/2017 |
| WO | 2010145427 A1 | 12/2010 |
| WO | 2015010339 A1 | 1/2015 |
| WO | 2016130403 A1 | 8/2016 |
| WO | 2017086922 A1 | 5/2017 |

OTHER PUBLICATIONS

J. J. Kayra, "A Survey on the Effect of LTE Advanced on Drive Test Tool Requirements", signal 10.11: 12. 4 Pages. http://www.oamk.fi/~karil/mit_studies/wireless_future_seminar/papers2013/final_paper_kayra_janne.pdf.

Ionel Petrut et al., "User Experience Analysis on Real 3G/4G Wireless Networks", ACTA Electrotehnica vol. 56, No. 1-2, Mediamira Science Publisher (2015). pp. 131-134. http://ie.utcluj.ro/files/acta/2015/Number1-2/paper23_Petrut.pdf.

Nicholas Gresset et al., "Interference-avoidance techniques: Improving ubiquitous user experience", IEEE Vehicular Technology Magazine vol. 7, Issue 4 (2012) . pp. 37-45 http://www.fr.mitsubishielectric-rce.eu/images/fck_upload/Gresset_VT12.pdf.

Duk-Sun Shim et al., "Application of Motion Sensors for Beam-Tracking of Mobile Stations in mmWave Communication Systems", Sensors vol. 14, No. 10 (2014). pp. 19622-19638. http://www.mdpi.com/1424-8220/14/10/19622/.

R. Mondel et al., "Performance evaluation of MDT assisted LTE RF fingerprint framework", 2014 Seventh International Conference on Mobile Computing and Ubiquitous Networking (ICMU) (2014). pp. 33-37. 10.1109/ICMU.2014.6799054. https://www.researchgate.net/publication/271462429_Performance_evaluation_of_MDT_assisted_LTE_RF_fingerprint_framework.

(56) References Cited

OTHER PUBLICATIONS

"Universal Mobile Telecommunications System (UMTS); LTE; Universal Terrestrial Radio Access (UTRA) and Evolved Universal Terrestrial Radio Access (E-UTRA); Radio measurement collection for Minimization of Drive Tests (MDT); Overall description; Stage 2", 3GPP TS 37.320 version 12.2.0 Release 12, ETSI TS 137 V12.2.0 (2014). 27 Pages. http://www.etsi.org/deliver/etsi_ts/137300_137399/137320/12.02.00_60/ts_137320v120200p.

Azad Ravanshid et al., "Multi-connectivity functional architectures in 5G". 2016 IEEE International Conference on Communications Workshops (ICC) (2016). 6 Pages. https://5gnorma.5g-ppp.eu/dissemination/conference-papers/.

Paul Harris et al., "An overview of massive MIMO research at the University of Bristol", Presented at the IET Radio Propagation and Technologies for 5G Conference (2016). 5 Pages. https://arxiv.org/abs/1705.07540.

"Making 5G NR a Reality", Qualcomm®, qualcomm.com, accessed Aug. 2017. 30 Pages.

Youping Zhao et al., "System Design and Calibration for Wideband Channel Sounding With Multiple Frequency Bands", IEEE Access 5 (2017). pp. 781-793.

"High Frequency and High Speed Design Engineers Unite in Boston", Microwave Journal, microwavejournal.com, Oct. 1, 2016. 15 Pages.

Koen Langendoen, "Medium access control in wireless sensor networks." Medium access control in wireless networks vol. 2 (2008). 22 Pages.

\* cited by examiner

BASE STATION WIRELESS CHANNEL SOUNDING

The present disclosure relates generally to wireless channel measurements, and more particularly to devices, non-transitory computer readable media, and methods for channel sounding via an in-service base station.

BACKGROUND

The spatial, temporal and frequency characterization of the wireless channel in various environments is called "channel characterization." The characterization provides a set of parameters which fully explain the medium's behavior in various scenarios. A wireless channel sounder is a device for measuring wireless channel related parameters such as complex impulse response, path loss, received signal strength (RSS), excess delay, or root-mean-square (RMS) delay spread, Doppler spread, fade rate, angle of arrival (AoA) and/or angle of departure (AoD), shadow fading, cross-polarization ratios, and the like as experienced by a user equipment or base station. In one implementation, a wireless channel sounder may utilize a directional antenna. For instance, to measure AoA using a directional antenna, the antenna may be turned in incremental steps to measure the RSS. The AoA is recorded where the RSS is at a maximum.

SUMMARY

In one example, the present disclosure discloses a method, computer-readable medium, and device for channel sounding via an in-service base station. For example, a method may include a processing system of a channel sounding receiver having a processor detecting a synchronization signal within a time and frequency resource grid of a base station and measuring a channel property at a first location based upon the synchronization signal that is received at the first location. The method may further include the processing system receiving the synchronization signal at a second location from the base station, measuring a channel property at the second location based upon the synchronization signal that is received at the second location, and selecting between the first location and the second location for a deployment of a customer premises equipment based upon the channel property at the first location and the channel property at the second location.

In another example, the present disclosure discloses a method, computer-readable medium, and device for channel sounding via an in-service base station. For example, a method may include a processing system of a channel sounding receiver having a processor detecting a reference signal within a time and frequency resource grid of a base station, and measuring a channel property at a first location based upon the reference signal that is received at the first location. The method may further include the processing system receiving the reference signal at a second location from the base station, measuring a channel property at the second location based upon the reference signal that is received at the second location, and selecting between the first location and the second location for a deployment of a customer premises equipment based upon the channel property at the first location and the channel property at the second location.

In still another example, the present disclosure discloses a method, computer-readable medium, and device for channel sounding via an in-service base station. For example, a method may include a processing system of a base station transmitting a channel state information reference signal via a transmit beam that is selected based upon a transmit beam selection optimization for a first endpoint device, receiving a notification of a presence of a channel sounding receiver that is available to perform a measurement of a channel property, and transmitting, in response to the presence of the channel sounding receiver, the channel state information reference signal via a beam swept transmission.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

Figure 1:
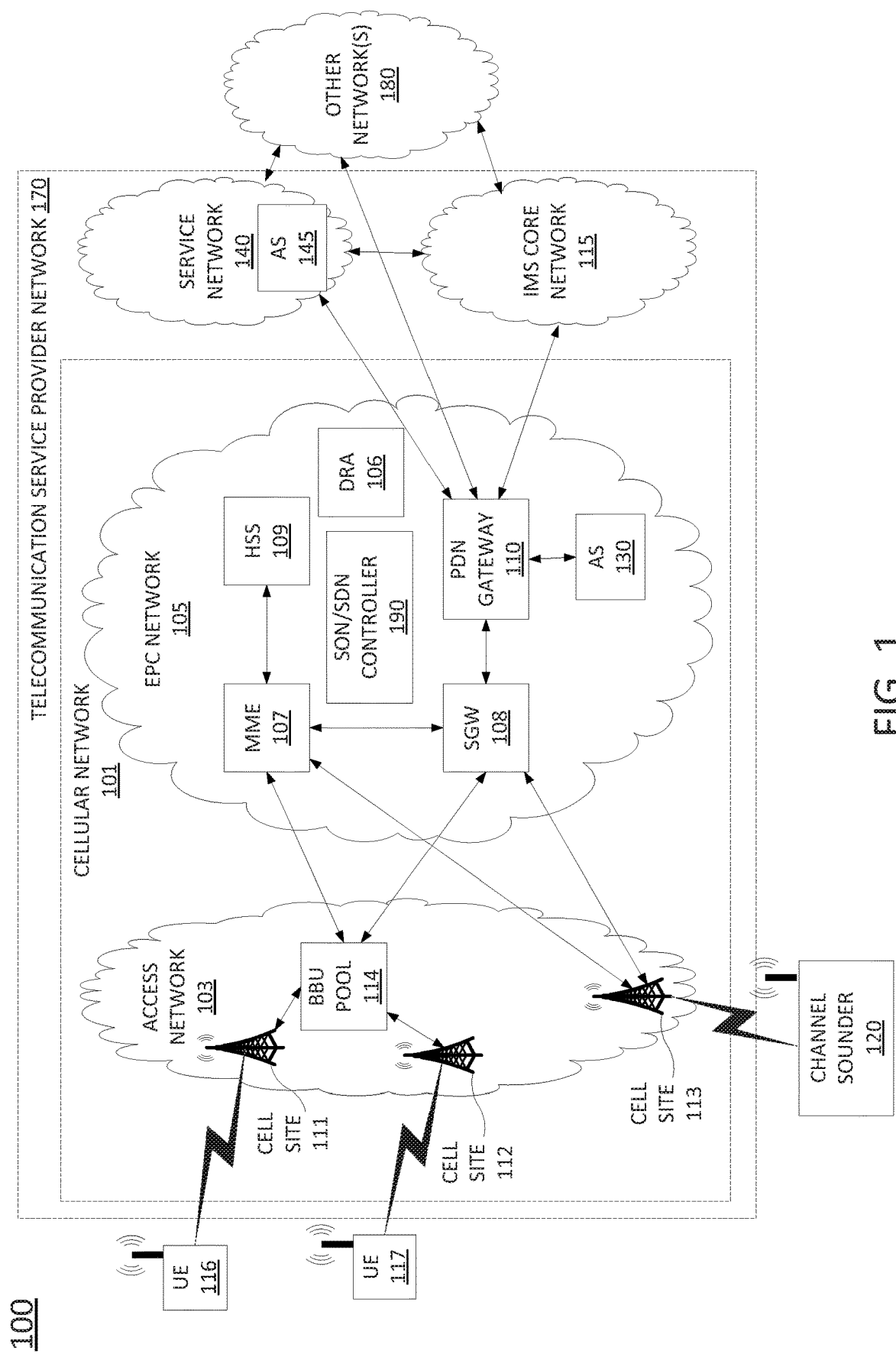
FIG. 1 illustrates a block diagram of an example system, in accordance with the present disclosure.

The present disclosure broadly discloses methods, computer-readable media, and devices for channel sounding via an in-service base station. For instance, the availability of millimeter wave spectrum for 3rd Generation Partnership Project (3GPP) 5G deployments gives rise to many opportunities for telecommunications services. Traditional cellular wireless communications networks, however, have not operated in these bands.

In general, a wireless channel sounding system may comprise a transmitter and a receiver for measuring wireless channel related parameters such as a complex impulse response of the wireless channel, a path loss, an excess delay, a root-mean-square (RMS) delay spread, a Doppler spread, a fade rate, an angle of arrival (AoA) or angle of departure (AoD), a shadow fading, a cross-polarization ratio, and the like as experienced by a user equipment or base station. The measurements of the wireless channel related parameters under a variety of test conditions enable the modeling of the behavior for these channel parameters under different scenarios and conditions, as well as the simulation and prediction of the performance of a base station or a user equipment under such scenarios and conditions. Thus, modeling of these wireless channel related parameters and using them in end-to-end network simulators can guide in mapping out the details of where and how to place transmitters and receivers in a network for the best mobile performance and experience.

For instance, in one example, a channel sounding system receiver may measure AoA using a directional antenna. The antenna may be turned in incremental steps to measure the received signal strength (RSS). The AoA is recorded where the RSS is maximum. More advanced channel sounding system receivers may determine AoA by calculating a phase difference between channel sounding waveforms received at antenna elements at different positions within a receiver array, and mapping the phase difference(s) to the incident direction of the channel sounding waveforms. Since the phase of a received signal is generally more stable than the received signal strength (RSS), AoA estimation using phase difference calculations can achieve higher accuracy than RSS-based localization approaches. Existing single-input single-output (SISO) channel sounding systems, such as those using directional antenna receivers, may be slow in performing measurements at least for certain channel parameters, may not allow for real-time monitoring of the parameters of interest, and may also be difficult to modify or may be unmodifiable to perform other types of measurements.

In a first example, a channel sounding system is described that uses the transceivers and baseband processors of a deployed/in-service wireless cellular communications system for channel sounding by inserting channel sounding waveforms into blank resources of a time-frequency resource grid of a base station. The channel sounding waveforms may be based on existing waveforms that are modified for the purpose of channel sounding or, alternatively, existing or new waveforms may be utilized that are solely or primarily for the purpose of channel sounding. In either case, in accordance with the first example of the present disclosure, the channel sounding waveforms are embedded into the base station time-frequency grid using forward compatible resources, i.e., time-frequency resources reserved by the network for future use cases, services, and/or applications. Thus, legacy user equipment will be oblivious to these waveforms, yet their receivers will interpret the waveforms according to the reserved resources (e.g., rate matching, measurement restrictions, etc.). Alternatively, or in addition, channel sounding waveforms may be embedded in legacy reserved resources of a base station time-frequency grid (e.g., which have subsequently been released and are no longer utilized for the reserved purpose). In one example, these reserved resources may be referred to as "blank resources." Accordingly, channel sounding may be utilized during installation time (e.g., for fixed wireless broadband (FWB)) to determine the best location and orientation of the customer premise equipment (CPE). Notably, the present example avoids the need to deploy a dedicated channel sounding transmitter at the base station transceiver location to sound the channel. Instead, the base station transceiver and baseband processor itself are used as the transmitter.

In one example, the base station transceiver inserts channel sounding waveforms into the time-frequency grid, e.g., a 5G "new radio" (NR) waveform, and uses the aforementioned reserved resources to inform the UEs that coexist in the network with the channel sounder receiver about the characterization parameters of the channel sounding waveform, such as the associated rate matching behavior and/or measurement restrictions. For instance, in one example a primary synchronization signal (PSS) of a synchronization signaling (SS) block is extended in frequency to create a wideband signal without changing the narrowband part of the PSS which a UE would expect (e.g., if the UE is operating according to 5G or similar wireless communications standard that specifies a narrowband PSS).

In the case of time domain processing, in one example the channel sounding waveform occupies a blank resource of the time-frequency grid but does not have any kind of alignment with the grid. By way of example and without any limitation, a Zadoff-Chu (ZC) sequence in the time domain may be used for channel sounding. In yet another example, in the case of frequency domain processing, the sounding signal may be inserted before an inverse Fast Fourier Transform (iFFT) stage in the transmitter. In either case, the receiver processing can be done in the time domain or frequency domain. In the latter case, however, the channel sounding waveform may be aligned with the frequency sub-carriers of the time-frequency grid.

In addition to the indication of the configuration of the blank/reserved resources, a channel sounding receiver may be configured with a copy of the channel sounding waveform/sequence which will be transmitted in a subset of the blank/reserved resources. The channel sounding receiver may also be configured with other characterization parameters, such as a waveform/sequence indication, timing indication (e.g., periodicity, offset, and the like), and frequency location (e.g. sub-band index, grid alignment, transmission bandwidth, and so forth). These parameters may be provided by higher layer signaling (e.g., at the radio resource control (RRC) layer), via pre-configuration, or at the application layer.

In another example, a channel sounder may request an "on-demand" configuration of the blank/reserved resources and corresponding channel sounding waveform/sequence transmission. Thus, the network may conserve resources and mitigate potential sources of interference for other user data by avoiding transmission of the channel sounding waveform/sequences unless a channel sounder is present and actively taking measurements. This indication from the channel sounder may be performed as part of a scheduling request message, other higher layer signaling, or at the application layer, and may include a request for transmission of the channel sounding waveform/sequence and corresponding characterization parameters such as transmission duration, periodicity, bandwidth, transmission power, and so forth.

In a second example, a channel sounding system may use the transceivers and baseband processors of a deployed/in-service wireless cellular communications system for channel sounding using standardized waveforms. In particular, the channel sounding is based on waveforms that are already available from other procedures, such as those for time/frequency synchronization, phase tracking, positioning estimation, and channel state information estimation. Like the first example, the second example of the present disclosure allows channel sounding to be used during installation time (e.g., for a fixed wireless broadband (FWB) deployment) to determine the best location and orientation of the customer premise equipment (CPE). The second example also obviates the need to install a channel sounding transmitter at the base station transceiver location to sound the channel. Instead, the base station transceiver and baseband processor itself can be used as the transmitter. However, in contrast to the first example, the second example utilizes existing waveforms for channel sounding, thereby minimizing the implementation and testing effort.

To illustrate, in one example, the channel sounding may be based upon the synchronization signal (SS) of the time-frequency grid of a base station, e.g., a "new radio" NR synchronization signal (SS), which may contain a primary synchronization signal (PSS), a secondary synchronization signal (SSS), a physical broadcast channel (PBCH), and a downlink modulation reference signal (DMRS), to measure one or more channel properties, or parameters, that characterize the channel. Since the synchronization signal is a narrowband signal (e.g., 40 MHz as opposed to 1 GHz), certain channel properties such as path loss, material loss, angular spread, and Doppler spread may be more easily measured. In one example, the measurements of channel properties may be derived from multiple signals within the SS block. The time/frequency location of the SS block within the time-frequency grid of the base station may be blindly detected by a channel sounder as part of an initial access procedure, or may be provided by higher layer signaling, such as at the radio resource control (RRC) layer, by pre-configuration, by the application layer, etc. Notably, channel sounding based upon the synchronization signaling (SS) block does not require the channel sounder (or "channel sounding receiver") to implement the full physical layer specification (e.g., for 5G NR deployment), but only the aspects of the initial access procedure pertaining to synchronization signal detection and measurement. This allows the channel sounder to perform the channel sounding measurements of the channel properties without transmitter capability.

In another example, channel sounding may be based upon one or more reference signals, such as a channel state information (CSI) reference signal (RS). In other words, the CSI-RS of a deployed/in-service base station/cell site may be used to measure channel properties that characterize the channel. When used for channel sounding in accordance with the present disclosure, the CSI-RS waveform/sequence may be referred to as a channel sounding waveform. Using CSI-RS allows for MIMO (e.g., multi-port) and wideband measurements (e.g., delay spread). More precisely, for CSI measurement, a base station (e.g., a "gNodeB" or "gNB" in emerging 5G terminology) may typically select a transmit beam that is best suited for the receiver. However, for the purposes of channel sounding, the CSI-RS may instead be beam swept at the base station/cell site transmitter. In this regard, it should be noted that in one example, beam sweeping of the CSI-RS may be made part of a permitted beam management procedure defined in the specification of the considered wireless cellular communications standard (e.g., 3GPP 5G). If, however, existing or emerging standards effectively prevent the CSI-RS from being beam swept, in another example, the base station transmitter may configure reserved resources and transmit beam swept CSI-RS for sounding purposes in the configured reserved resources. For instance, reserved resources are described above in connection with the first example of the present disclosure and may comprise blank resources that are set aside for future and/or legacy compatibility.

In one example, when CSI-RS is used for channel sounding, the CSI-RS density can be increased by configuring multiple CSI-RS resources, all of which may use the same sequence. In this example, the channel sounding receiver can aggregate the CSI-RS from multiple resources to obtain processing gain. Moreover, in order to establish over-the-air (OTA) calibration between the channel sounding transmitter (e.g., a base station) and channel sounding receiver, multiple CSI-RS resources can be aggregated to form per-antenna-element antenna ports, e.g., using a special analog precoder in the radio frequency (RF) domain. In such an example, the channel sounding receiver can use these per antenna element antenna ports to estimate the phase offset between antenna elements.

In yet another example, channel sounding may be based upon positioning reference signals (PRS) that are transmitted by a base station. PRSs are typically received by a UE from several base stations, and are used to determine its position based upon time differences in the receipt of the several PRSs relative to reference timing signal. However, in accordance with the second example of the present disclosure, the PRS may be used to measure channel properties that characterize the channel. When used for channel sounding in accordance with the present disclosure, the PRS waveform/sequence may be referred to as a channel sounding waveform.

In a third example, a channel sounding system may use the transceivers and baseband processors of a deployed/in-service wireless cellular communications system for channel sounding using non-random predetermined bit sequences. In particular, a non-random/pseudo-random predetermined bit sequence is transmitted on a shared data channel and the resulting waveform generated from the pseudo-random bit sequence ("data") is used for channel sounding. The bit sequence is predetermined insofar as it is selected in advance (e.g., by the base station) or the channel sounding receiver. Accordingly, the resulting waveform may be referred to as a "channel sounding waveform." Like the first and second examples, the third example of the present disclosure allows channel sounding to be used during installation time (e.g., for a fixed wireless broadband (FWB) deployment) to determine the best location and orientation of the customer premise equipment (CPE). The third example also obviates the need to install a channel sounding transmitter at the base station transceiver location to sound the channel. Instead, the base station transceiver and baseband processor itself can be used as the transmitter.

In one example, the pre-determined bit sequence for a channel sounding waveform is inserted in the bit domain as a medium access control (MAC) transport block, while the physical layer processing remains in accordance with the wireless cellular communications standard that is implemented by the base station transmitter. To illustrate, the generating and transmitting of a channel sounding waveform may proceed as follows. First, the base station MAC scheduler may allocate the entire available transmission bandwidth to the physical data shared channel (PDSCH) of a channel sounding receiver. In one example, the MAC scheduler may also set the transmit rank of said PDSCH to 1. In addition, in one example, the MAC scheduler may also set a modulation coding scheme (MCS) to lowest available MCS of the PDSCH. For example, the lowest MCS level may be associated with binary phase shift keying (BPSK), quadrature phase shift keying (QPSK), or other modulation schemes are possible for association with the lowest MCS level. Alternatively, the MAC scheduler may not choose the lowest MCS level but another MCS level. In still another example, the MAC scheduler may assign a transmission scheme not associated with a precoding matrix indicator (PMI) with the PDSCH, e.g., one based on pre-coder cycling.

The MAC scheduler may next set the payload (data) part of the MAC protocol data unit (PDU) to a predetermined bit sequence. The predetermined bit sequence (e.g., a pseudo-random set of bits) effectively creates the transport block for that transmission time interval (TTI). It should be noted that the transport block bits are typically not known in advance at the receiver. However, in this case, the transport block bits (the predetermined bit sequence) are known at the receiver (i.e., the channel sounding receiver). The channel sounding receiver may also store various parameters associated with the predetermined bit sequence and/or characterizing the channel sounding waveform that is generated from the predetermined bit sequence, such as: code rate, redundancy version, modulation level, precoding matrix indicator (PMI), resource mapping, and so forth. Accordingly, in one example, the entire PDSCH is a known wideband signal at the channel sounding receiver.

In another example, the base station transmitter sets the payload or data part of a radio link control (RLC) PDU to a predetermined bit sequence (where the predetermined bit sequence is associated with a channel sounding waveform to be transmitted). In a further example, the base station transmitter sets the payload or data part of the Packet Data Convergence Protocol (PDCP) PDU to a predetermined bit sequence. In still another example, an OCNS (orthogonal channel noise simulator) at the base station (e.g., a gNodeB) is used to generate a pre-determined pseudo-random sequence which is inserted into the physical layer (PHY) processing unit at the transport block level. In this example, the MAC at the gNodeB may use the entire bandwidth available for the PDSCH to generate the predetermined pseudo-random sequence and does not allocate any resources to another user equipment. It should be noted that the predetermined pseudo-random sequence may be notified in advance to the channel sounding receiver, e.g., via control signaling.

Other points in the protocol stack where the predetermined bit sequence may be included as the payload or data part of a PDU or service data unit (SDU) are also within the scope of the third example. Generally, the higher in the protocol stack of the considered wireless cellular communications standard, the easier the example is implementable within the confines of the considered wireless cellular communications standard. In another example, the base station (e.g., a gNodeB) uses forward compatible blank resources that are not available to other UEs, and uses these blank resources to generate a wideband signal using the NR physical layer. (Forward compatible black resources are described in greater detail above in connection with the first example).

In one example, sequence numbers may not be known in advance when the predetermined bit sequence is included as the payload or data part in higher layers of the protocol stack. In addition, although the base station transmitter may insert the predetermined bit sequence at different layers of the protocol stack, the channel sounding receiver may process the received predetermined set of bits at the physical layer as part of the channel sounding measurement procedure without passing the payload to higher layers in the channel sounding receiver's protocol stack. Thus, the received channel sounding waveform may be directly processed within the physical layer, or may be stored/transported for processing in real-time or at a later time by the channel sounding receiver or by a different device or system.

In one embodiment, the channel sounding receiver may be preconfigured with the predetermined bit or may be provided with the predetermined bit sequence and corresponding characterization parameters for channel measurement based on higher layer signaling (e.g., at the RRC layer or application layer). The channel sounding receiver may be provided with the exact bits of the sequence or one or more initialization parameters, such as a pseudo-random sequence seed which may be a function of one or more parameters including system frame number, slot index, symbol index, (virtual) cell identifier (ID), and/or user equipment (UE) ID (where the UE is the channel sounder receiver). In another example, the channel sounding receiver may be configured with a pattern or periodicity indicating the transmission of the channel sounding waveform relative to the system timing (e.g., a radio frame). This timing indication may include a periodicity, offset expressed in absolute time (e.g., seconds or milliseconds) or scheduling units (e.g., slots or symbols). In one example, the radio frame may be in accordance with the 5G "new radio" (NR) radio frame.

Additionally, if multiple frequency sub-bands or carriers are configured for the channel sounding receiver to receive a channel sounding waveform, or channel sounding waveforms, the configuration may include information regarding the associated frequency location(s) (or hopping pattern) associated with a given time location. Accordingly, the channel sounding receiver may attempt to detect the channel sounding signal at the configured locations and may switch off components of the receiver chain between channel sounding waveform transmission instances, or may continue monitoring downlink radio frames for normal control/data channel transmissions.

In another example, the channel sounding receiver may operate without a copy and/or characterization parameters of the predetermined bit sequence and/or the channel sounding waveform that is generated therefrom. Instead, the channel sounding receiver may attempt to blindly detect the channel sounding waveform and upon successfully processing a transport block matching the preconfigured sounding signal characteristics (e.g., after a cyclic redundancy check (CRC) pass detection), proceed to process the sequence as part of its configured channel sounding measurement procedure.

The following relates to all of the first, second, and third examples described above. In one example, for purposes of calibration and account for unknown parameters, such as power level, antenna gain, and beam pattern, for each beam sweep the channel sounding receiver may be placed near the base station transmitter/antennas in several line-of-sight (LOS) places. By sounding the channel in a three-dimensional (physical/spatial) grid up close to the transmitting antennas, the channel sounding receiver may collect a spatially dense sample of channel property measurements related to channel. This dense three-dimensional information can then be used to reverse engineer various unknown parameters, such as the power, antenna gain, beam pattern of the beam sweep, and so forth.

For all of the first, second, and third examples described above, the channel sounder, or channel sounding receiver, may comprise a user equipment (UE) that is equipped to operate according to the specification of the considered wireless cellular communications standard (e.g., 5G MIMO and/or millimeter wave). However, the UE may be configured with additional capabilities, including the ability to beam sweep the receive beam, the ability to log the multiple-input multiple-output (MIMO) channel response, and the ability to use the MIMO channel response to derive small scale and large scale parameters (channel property measurements) that characterize the channel. In addition, in one example the sounder receiver may comprise a system that includes a user equipment (UE) for communications with the base station transmitter and a channel sounder receiver unit. For example, the UE may be implemented via a universal serial bus (USB) dongle that allows a channel sounder receiver software to run as an application on a processing unit, e.g., of a computer that connects via the (USB) interface with a UE modem on the USB dongle.

With respect to all of the first, second, and third examples described above, the channel sounding receiver may exchange control information with the base station transmitter that is used for channel sounding. In one example, the UE functions of the channel sounding receiver could either be of the same standard/release as the cellular base station transmitter that acts as the channel sounding transmitter or of a different standard/release (e.g., 3GPP 4G/Long Term Evolution (LTE), 5G new radio (NR), or other set(s) of specifications). For example, in case of the UE being according to the specification of the considered wireless cellular communications standard (e.g., 5G NR) but with some additional capabilities, both the UE and the cellular base station transmitter that acts as sounder could be implemented according to the NR specifications notwithstanding the additional capabilities of the sounder transmitter at the base station side and the sounder receiver at the UE side. Alternatively, the base station could be implemented according to the NR specifications with additional capabilities to act as sounder transmitter. However, the base station may exchange the control information with the channel sounding receiver via an LTE air interface. Notably, using the LTE air interface for the control signaling may increase the range of the channel sounding capability beyond what would be possible if it was solely operating in millimeter wave spectrum using NR technology.

With respect to all three of the examples above, the channel sounding receiver may not implement the entire protocol stack according to the specification of the wireless cellular communications standard associated with the channel for which channel properties are to be measured (e.g., 5G NR). For example, the channel sounding receiver may only implement or utilize the subset of functions that is required for the purpose of channel sounding. In one example, the channel sounding receiver may control the base station transmitter, e.g., by providing channel sounding waveforms, instructions as to when and how to transmit channel sounding waveforms, and so forth. However, in another example, the base station that is used for channel sounding may control the channel sounding receiver. In addition, in one example the roles of the base station and channel sounding can be reversed. In other words, a channel sounder receiver can also be integrated with a base station, in which case the channel sounding transmitter is integrated with a user equipment. In one example, the role of the base station can be implemented in a second UE. In other words, channel sounding receiver can be one UE and channel sounding transmitter can be another UE. In this case, a direct UE-to-UE (e.g., sidelink) is used for channel sounding.

Although examples of the present disclosure are applicable to a wide range of frequency bands, in one example, the present disclosure may relate to centimeter and millimeter wave systems. For instance, for all of the examples herein, the considered wireless cellular communications standard can be the Third Generation Project (3GPP) New Radio (NR) radio access technology. For the embodiments herein, the base station can be a gNB or gNodeB or base station of a 5G-RAN (fifth generation radio access network). It should be noted that for illustrative purposes, various base station systems are described herein in connection with particular quantities or values. However, base station systems of the present disclosure may include different quantities of various components, and/or operating parameters which may have any number of different values. For instance, a base station system may have a different number transmit antennas, may have antennas with different beamwidths, may utilize different frequencies, may utilize different transmit powers, and so forth. In addition, a base station system may include a different number of antenna sector units covering a same or a different range in azimuth and/or elevation, may have sectors with different coverages, may have a different number of antenna elements per sector, may have a different desired SNRs, may utilize a fewer number of samples per antenna for a different averaging gain, and so forth. These and other aspects of the present disclosure are discussed in greater detail below in connection with the examples of FIGS. 1-8.

To better understand the present disclosure, FIG. 1 illustrates an example network, or system 100 in which examples of the present disclosure for channel sounding via an in-service base station may operate. In one example, the system 100 includes a telecommunication service provider network 170. The telecommunication service provider network 170 may comprise a cellular network 101 (e.g., a 4G/Long Term Evolution (LTE) network, a 4G/5G hybrid network, or the like), a service network 140, and a core network, e.g., an IP Multimedia Subsystem (IMS) core network 115. The system 100 may further include other networks 180 connected to the telecommunication service provider network 105. FIG. 1 also illustrates various mobile endpoint devices 116 and 117, e.g., user equipment or user endpoints (UE). The mobile endpoint devices UE 116 and 117 may each comprise a cellular telephone, a smartphone, a tablet computing device, a laptop computer, a pair of computing glasses, a wireless enabled wristwatch, or any other cellular-capable mobile telephony and computing device (broadly, "mobile endpoint devices").

In one example, the cellular network 101 comprises an access network 103 and a core network, Evolved Packet Core (EPC) network 105. In one example, the access network 103 comprises a cloud RAN. For instance, a cloud RAN is part of the 3rd Generation Partnership Project (3GPP) 5G specifications for mobile networks. As part of the migration of cellular networks towards 5G, a cloud RAN may be coupled to an EPC network until new cellular core networks are deployed in accordance with 5G specifications. In one example, access network 103 may include cell sites 111 and 112 and a baseband unit (BBU) pool 114. In a cloud RAN, radio frequency (RF) components, referred to as remote radio heads (RRHs), may be deployed remotely from baseband units, e.g., atop cell site masts, buildings, and so forth. In one example, the BBU pool 114 may be located at distances as far as 20-80 kilometers or more away from the antennas/remote radio heads of cell sites 111 and 112 that are serviced by the BBU pool 114. It should also be noted in accordance with efforts to migrate to 5G networks, cell sites may be deployed with new antenna and radio infrastructures such as multiple input multiple output (MIMO) antennas, and millimeter wave antennas. In this regard, a cell, e.g., the footprint or coverage area of a cell site, may in some instances be smaller than the coverage provided by NodeBs or eNodeBs of 3G-4G RAN infrastructure. For example, the coverage of a cell site utilizing one or more millimeter wave antennas may be 1000 feet or less.

Although cloud RAN infrastructure may include distributed RRHs and centralized baseband units, a heterogeneous network may include cell sites where RRH and BBU components remain co-located at the cell site. For instance, cell site 113 may include RRH and BBU components. Thus, cell site 113 may comprise a self-contained "base station." With regard to cell sites 111 and 112, the "base stations" may comprise RRHs at cell sites 111 and 112 coupled with respective baseband units of BBU pool 114.

In accordance with the present disclosure any one or more of cell sites 111-113 may be deployed with antenna and radio infrastructures, including multiple input multiple output (MIMO) and millimeter wave antennas. Furthermore, in accordance with the present disclosure, a base station (e.g., cell sites 111-113 and/or baseband units within BBU pool 114) may comprise all or a portion of a computing device or system, such as computing system 900, and/or processing system 902 as described in connection with FIG. 9 below, and may be configured to provide one or more functions for channel sounding via an in-service base station, and for performing various other operations in accordance with the present disclosure. For instance, cell sites 111-113 and/or baseband units within BBU pool 114 may be configured to perform functions such as those described below in connection with the example methods of FIGS. 2-8. For instance, cell site 113 may receive a notification of a presence of channel sounder 120, may transmit to or receive from the channel sounder 120 test channel sounding waveforms and/or characterization parameters, including timing information, signal bandwidth, signal power, sub-carrier identification, and the like, may transmit the channel sounding waveforms via the "channel" for which the channel property or properties is/are to be measured, and so forth.

Figure 6:
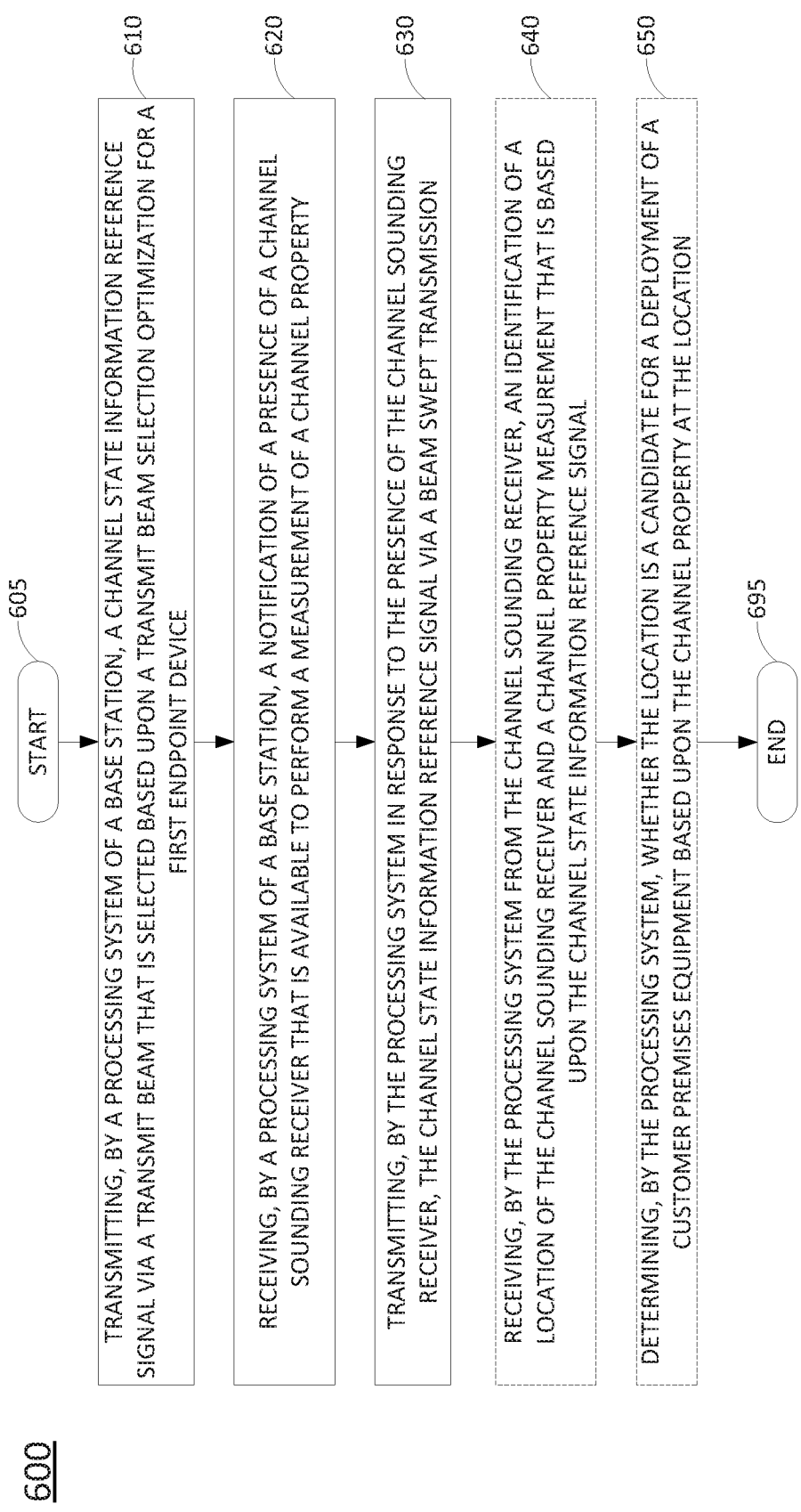
FIG. 6 illustrates a flowchart of a fifth example method for channel sounding via an in-service base station.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 6 and discussed below) or multiple computing devices collectively configured to perform various steps, functions, and/or operations in accordance with the present disclosure.

In one example, the channel sounder 120 may be used to determine measures of various wireless channel parameters (broadly "channel sounding"). In one example, channel sounder 120 may comprise a user equipment, e.g., a mobile endpoint device comprising a cellular telephone, a smartphone, a tablet computing device, a laptop computer, or any other cellular-capable mobile telephony and computing devices. In one example, channel sounder 120 may comprise a dedicated channel sounding device.

In one example, the channel sounder 120 may be used to receive channel sounding waveforms that are transmitted in an environment, where the channel sounding waveforms, as received, may be used to calculate or determine the measures of various wireless channel parameters such as: multipath amplitude(s), phase(s), direction(s) or angle(s) of arrival, a path loss, an excess delay, a RMS delay spread, a Doppler spread, a fade rate, a complex impulse response of the wireless channel, and so forth.

In one example, the channel sounder 120 includes a plurality of antenna sector units that may be activated and deactivated according to a schedule or otherwise synchronized to the transmission of channel sounding waveforms. In one example, baseband converters may receive radio frequency (RF) signals from the antenna sector units and convert the signals into baseband signals. Digital sampling units may convert the baseband signals into digital representations of the channel sounding waveforms that are received via the respective antenna sector units. For instance, the digital sampling units may oversample the analog baseband signals at a sampling interval under the control of timing signals from a clock circuit to create the digital representations of the channel sounding waveforms.

The digital sampling units may output the digital representations of the channel sounding waveforms to a processor unit that is configured to perform various operations for determining measures of wireless channel parameters, as described herein. For instance, the channel sounder 120 may calculate, based upon the digital representations of the channel sounding waveforms, a phase difference between channel sounding waveforms received via respective antennas. The processor unit may further determine an angle of arrival (AoA) based upon the antenna positions and the phase difference. In one example, the channel sounder 120 may receive a reference copy or copies of the channel sounding waveforms(s) and/or a set of parameters characterizing the channel sounding waveforms, from the transmitter (e.g., cell site 113). Accordingly, the channel sounder 120 may determine a carrier-to-interference (CIR) ratio by comparing a sequence received via one of the antenna sector units with a reference copy. Alternatively, or in addition, the channel sounder 120 may calculate a path loss, an excess delay, a RMS delay spread, a fade rate, a Doppler spread, a complex impulse response, or the like, from the digital representations of the channel sounding waveforms.

In one example, the channel sounder 120 may perform further functions, including communicating with a transmitter-side device (e.g., cell site 113) to coordinate the timing of the transmission of the channel sounding waveforms with activations and deactivations of antenna sector units to receive reference copies of channel sounding waveforms that are transmitted, and so forth. For instance, the channel sounder 120 may maintain a communication link, such as via control signaling communications or an out-of band wireless link (e.g., using a different set of antennas and a different RF communication band than the antenna sector units that are used for channel sounding/channel property measurements in accordance with the present disclosure) to communicate with cell site 113.

In one example, the channel sounder 120 may comprise all or a portion of a computing device or system, such as computing system 900, and/or processing system 902 as described in connection with FIG. 9 below, and may be configured to provide one or more functions for channel sounding via an in-service base station, and for performing various other operations in accordance with the present disclosure. For instance, channel sounder 120 may be configured to perform functions such as those described below in connection with the example methods of FIGS. 2-8. In this regard, it should be noted that in one example, channel sounding receiver may control a channel sounding via an in-service base station, e.g., by instructing cell site 113 or another channel sounding transmitter to begin transmission of channel sounding waveforms, by providing test copies and/or parameters characterizing the channel sounding waveforms, including bandwidth, periodicity, and bit sequences, and so forth. In addition, channel sounding receiver may obtain and store channel property measurements, and may perform additional operations based upon the channel property measurements, such as determining locations and/or orientations for deployment of customer premises equipment, e.g., for fixed wireless broadband (FWB), or the like. However, in another example, channel sounder 120 may be controlled by another device, such as cell site 113. For instance, channel sounder 120 may receive test copies or characterization parameters of channel sounding waveforms from cell site 113, may measure channel properties in accordance with the test copies or characterization parameters, and may transmit the measured channel properties to cell site 113. For example, cell site 113 or another component of telecommunication network 170 may then aggregate channel property measures, and may determine locations and/or orientations for deployment of customer premises equipment, e.g., for fixed wireless broadband (FWB), or the like, based upon the channel property measures, and so forth.

In one example, the EPC network 105 provides various functions that support wireless services in the LTE environment. In one example, EPC network 105 is an Internet Protocol (IP) packet core network that supports both real-time and non-real-time service delivery across a LTE network, e.g., as specified by the 3GPP standards. In one example, all cell sites in the access network 103 are in communication with the EPC network 105 via baseband units in BBU pool 114. In operation, mobile endpoint device UE 116 may access wireless services via the cell site 111 and mobile endpoint device UE 117 may access wireless services via the cell site 112 located in the access network 103. It should be noted that any number of cell sites can be deployed in access network. In one illustrative example, the access network 103 may comprise one or more cell sites.

In EPC network 105, network devices such as Mobility Management Entity (MME) 107 and Serving Gateway (SGW) 108 support various functions as part of the cellular network 101. For example, MME 107 is the control node for the LTE access network. In one embodiment, MME 107 is responsible for UE (User Equipment) tracking and paging (e.g., such as retransmissions), bearer activation and deactivation process, selection of the SGW, and authentication of a user. In one embodiment, SGW 108 routes and forwards user data packets, while also acting as the mobility anchor for the user plane during inter-cell handovers and as the anchor for mobility between LTE and other wireless technologies, such as 2G and 3G wireless networks.

In addition, EPC network 105 may comprise a Home Subscriber Server (HSS) 109 that contains subscription-related information (e.g., subscriber profiles), performs authentication and authorization of a wireless service user, and provides information about the subscriber's location. The EPC network 105 may also comprise a packet data network (PDN) gateway 110 which serves as a gateway that provides access between the EPC network 105 and various data networks, e.g., service network 140, IMS core network 115, other network(s) 180, and the like. The packet data network gateway is also referred to as a PDN gateway, a PDN GW or a PGW. In addition, the EPC network 105 may include a Diameter routing agent (DRA) 106, which may be engaged in the proper routing of messages between other elements within EPC network 105, and with other components of the system 100, such as a call session control function (CSCF) (not shown) in IMS core network 115. For clarity, the connections between DRA 106 and other components of EPC network 105 are omitted from the illustration of FIG. 1.

In one example, service network 140 may comprise one or more devices, such as application server (AS) 145 for providing services to subscribers, customers, and or users. For example, telecommunication service provider network 170 may provide a cloud storage service, web server hosting, and other services. As such, service network 140 may represent aspects of telecommunication service provider network 170 where infrastructure for supporting such services may be deployed. In one example, AS 145 may comprise all or a portion of a computing device or system, such as computing system 900, and/or processing system 902 as described in connection with FIG. 9 below, specifically configured to provide one or more service functions in accordance with the present disclosure, such as a network-based secure data storage for channel sounding records (broadly "channel property measurements"). For instance, cell site 113 may collect channel property measurements from channel sounder 120 and may forward the channel property measurements to AS 145 for storage. Although a single application server, AS 145, is illustrated in service network 140, it should be understood that service network 140 may include any number of components to support one or more services that may be provided to one or more subscribers, customers, or users by the telecommunication service provider network 170.

In one example, other networks 180 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 180 may include different types of networks. In another example, the other networks 180 may be the same type of network. In one example, the other networks 180 may represent the Internet in general.

In accordance with the present disclosure, any one or more of the components of EPC network 105 may comprise network function virtualization infrastructure (NFVI), e.g., SDN host devices (i.e., physical devices) configured to operate as various virtual network functions (VNFs), such as a virtual MME (vMME), a virtual HHS (vHSS), a virtual serving gateway (vSGW), a virtual packet data network gateway (vPGW), and so forth. For instance, MME 107 may comprise a vMME, SGW 108 may comprise a vSGW, and so forth. In this regard, the EPC network 105 may be expanded (or contracted) to include more or less components than the state of EPC network 105 that is illustrated in FIG. 1. In this regard, the EPC network 105 may also include a self-optimizing network (SON)/software defined network (SDN) controller 190. In one example, SON/SDN controller 190 may function as a self-optimizing network (SON) orchestrator that is responsible for activating and deactivating, allocating and deallocating, and otherwise managing a variety of network components. For instance, SON/SDN controller 190 may activate and deactivate antennas/remote radio heads of cell sites 111 and 112, respectively, may allocate and deactivate baseband units in BBU pool 114, and may perform other operations for activating antennas based upon a location and a movement of a group of mobile endpoint devices, in accordance with the present disclosure.

In one example, SON/SDN controller 190 may further comprise a SDN controller that is responsible for instantiating, configuring, managing, and releasing VNFs. For example, in a SDN architecture, a SDN controller may instantiate VNFs on shared hardware, e.g., NFVI/host devices/SDN nodes, which may be physically located in various places. In one example, the configuring, releasing, and reconfiguring of SDN nodes is controlled by the SDN controller, which may store configuration codes, e.g., computer/processor-executable programs, instructions, or the like for various functions which can be loaded onto an SDN node. In another example, the SDN controller may instruct, or request an SDN node to retrieve appropriate configuration codes from a network-based repository, e.g., a storage device, to relieve the SDN controller from having to store and transfer configuration codes for various functions to the SDN nodes.

In accordance with the present disclosure, SON/SDN controller 190 may therefore control various components within EPC network 105 and/or within access network 103 to support the traffic that is accommodated by the activation of antennas/remote radio heads of cell sites 111 and 112, respectively and the allocation of baseband units in BBU pool 114. For instance, SON/SDN controller 190 (e.g., performing functions of a SON orchestrator) may activate an antenna of cell site 111 and assign a baseband unit in BBU pool 114 when a group of mobile endpoint devices is detected near the cell site 111. SON/SDN controller 190 (e.g., performing functions of a SDN controller) may further instantiate VNFs to function as routers, switches, gateways, and the like to ensure that sufficient backhaul resources are available for the traffic to transit the access network 103 and/or EPC network 105. In addition, as mentioned above, any one or more of the DRA 106, MME 107, SGW 108, HSS 109, and PGW 110 may comprise VNFs instantiated on host devices. As such, SON/SDN controller 190 may perform similar operations to instantiate, configure, reconfigure, and decommission such components in support of examples of the present disclosure for activating antennas based upon a location and a movement of a group of mobile endpoint devices.

In one example, SON/SDN controller 190 may comprise all or a portion of a computing device or system, such as computing system 900, and/or processing system 902 as described in connection with FIG. 9 below, and may be configured to provide one or more functions to support examples of the present disclosure for channel sounding via an in-service base station, and for performing various other operations in accordance with the present disclosure. For example, SON/SDN controller 190 may ensure that a cell site 111-113 and/or baseband unit of BBU pool 114 is provisioned with configuration code which, when executed by a processing system of the respective component(s), cause various operations in connection with the examples of FIGS. 2-8 to be performed. For instance, SON/SDN controller 190 may store such configuration code and provision the code to the respective component(s), or may direct the respective component(s) to obtain the configuration code from another repository.

Accordingly, the SON/SDN controller 190 may be connected directly or indirectly to any one or more network elements of EPC network 105, and of the system 100 in general. Due to the relatively large number of connections available between SON/SDN controller 190 and other network elements, none of the actual links to the application server are shown in FIG. 1. Similarly, intermediate devices and links between DRA 106, MME 107, SGW 108, eNodeBs 111 and 112, PDN gateway 110, and other components of system 100 are also omitted for clarity, such as additional routers, switches, gateways, and the like.

As further illustrated in FIG. 1, EPC network 105 may further include an application server (AS) 130, which may comprise all or a portion of a computing device or system, such as computing system 900, and/or processing system 902 as described in connection with FIG. 9 below, and may be configured to perform various operations in connection with channel sounding via an in-service base station, and for performing various other operations in accordance with the present disclosure. For instance, AS 130 may select channel sounding waveforms to be used for channel property measurements, may provide the channel sounding waveforms to base stations for transmission, may provide test copies and/or characterization parameters of channel sounding waveforms to channel sounding receivers, such as channel sounder 120, and so forth. In this regard, AS 130 may maintain communications with BBU pool 114, cell sites 111-113, channel sounder 120, and so forth, via PDN gateway 110 and SGW 108, for example. AS 130 may also receive channel property measurements from channel sounding receivers via respective base stations, and may perform other operations based upon the channel property measurements that are received. For instance, AS 130 may select a location and/or orientation of a customer premises equipment (CPE), based upon the channel property measurements. For example, channel sounding via cell site 113 and channel sounder 120 may be performed at several candidate locations for a CPE, and a location (and/or orientation) with the highest signal to interference and noise ratio (SINR), may be selected. In one example, AS 130 may collect and store channel property measurements locally, e.g., in an internal or attached storage device, or remotely, e.g., in a cloud based data storage infrastructure, or the like. For instance, AS 130 may store the channel property measurements in AS 145 of service network 140, may retrieve the channel property measurements to calculate a preferred CPE location and/or orientation, or to perform other operations in accordance with the present disclosure.

The foregoing description of the system 100 is provided as an illustrative example only. In other words, the example of system 100 is merely illustrative of one network configuration that is suitable for implementing embodiments of the present disclosure. As such, other logical and/or physical arrangements for the system 100 may be implemented in accordance with the present disclosure. For example, the system 100 may be expanded to include additional networks, such as network operations center (NOC) networks, additional access networks, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For instance, in one example, SON/SDN controller 190 may be spilt into separate components to operate as a SON orchestrator and a SDN controller, respectively. Similarly, although the SON/SDN controller 190 is illustrated as a component of EPC network 105, in another example SON/SDN controller 190, and/or other network components may be deployed in an IMS core network 115 instead of being deployed within the EPC network 105, or in other portions of system 100 that are not shown, while providing essentially the same functionality. Similarly, functions described herein with respect to AS 130 may alternatively or additional be provided by AS 145.

It should also be noted that the foregoing is described primarily in connection with examples where channel sounding is performed with respect to cell site 113 and channel sounder 120. However, in other, further, and different examples, channel sounding may be performed at cell site 111 or cell site 112. For instance, channel sounder 120 may be deployed within communication and/or reception range of cell site 111 or cell site 112, and channel sounding waveforms may be transmitted by cell site 111 or cell site 112, respectively. In addition, although channel sounder 120 comprises a dedicated channel sounding receiver in one example, it should be noted that examples of the present disclosure may also utilize UE 116, UE 117 or other mobile endpoint devices as a channel sounding receiver. For instance, UE 116 and/or UE 117 may include a MIMO antenna to receive multi-path and/or spatial diversity signals, a gyroscope and compass to determine orientation(s), and so forth. Thus, in one example, UE 116 and/or UE 117 may comprise all or a portion of a computing device or system, such as computing system 900, and/or processing system 902 as described in connection with FIG. 9 below, and may be configured to perform various operations for channel sounding via an in-service base station, and for performing various other operations in accordance with the present disclosure.

In addition, although aspects of the present disclosure have been discussed above in the context of a long term evolution (LTE)-based wireless network, examples of the present disclosure are not so limited. Thus, the teachings of the present disclosure can be applied to other types of wireless networks (e.g., a 2G network, a 3G network, a 5G network, an integrated network, e.g., including any two or more of 2G-5G infrastructure and technologies, and the like), that are suitable for use in connection with examples of the present disclosure for channel sounding via an in-service base station. For example, as illustrated in FIG. 1, the cellular network 101 may represent a "non-stand alone" (NSA) mode architecture where 5G radio access network components, such as a "new radio" (NR), "gNodeB" (or "gNB"), and so forth are supported by a 4G/LTE core network (e.g., a Evolved Packet Core (EPC) network 105). However, in another example, system 100 may instead comprise a 5G "standalone" (SA) mode point-to-point or service-based architecture where components and functions of EPC network 105 are replaced by a 5G core network, which may include an access and mobility management function (AMF), a user plane function (UPF), a session management function (SMF), a policy control function (PCF), a unified data management function (UDM), an authentication server function (AUSF), an application function (AF), a network repository function (NRF), and so on. For instance, in such a network, application server (AS) 130 of FIG. 1 may represent an application function (AF) for managing channel sounding via an in-service base station in accordance with various examples of the present disclosure. In addition, any one or more of cell sites 111-113 may comprise 2G, 3G, 4G and/or LTE radios, e.g., in addition to 5G new radio (NR) functionality. For instance, in non-standalone (NSA) mode architecture, LTE radio equipment may continue to be used for cell signaling and management communications, while user data may rely upon a 5G new radio (NR), including millimeter wave communications, for example. Thus, these and other modifications are all contemplated within the scope of the present disclosure.

Figure 2:
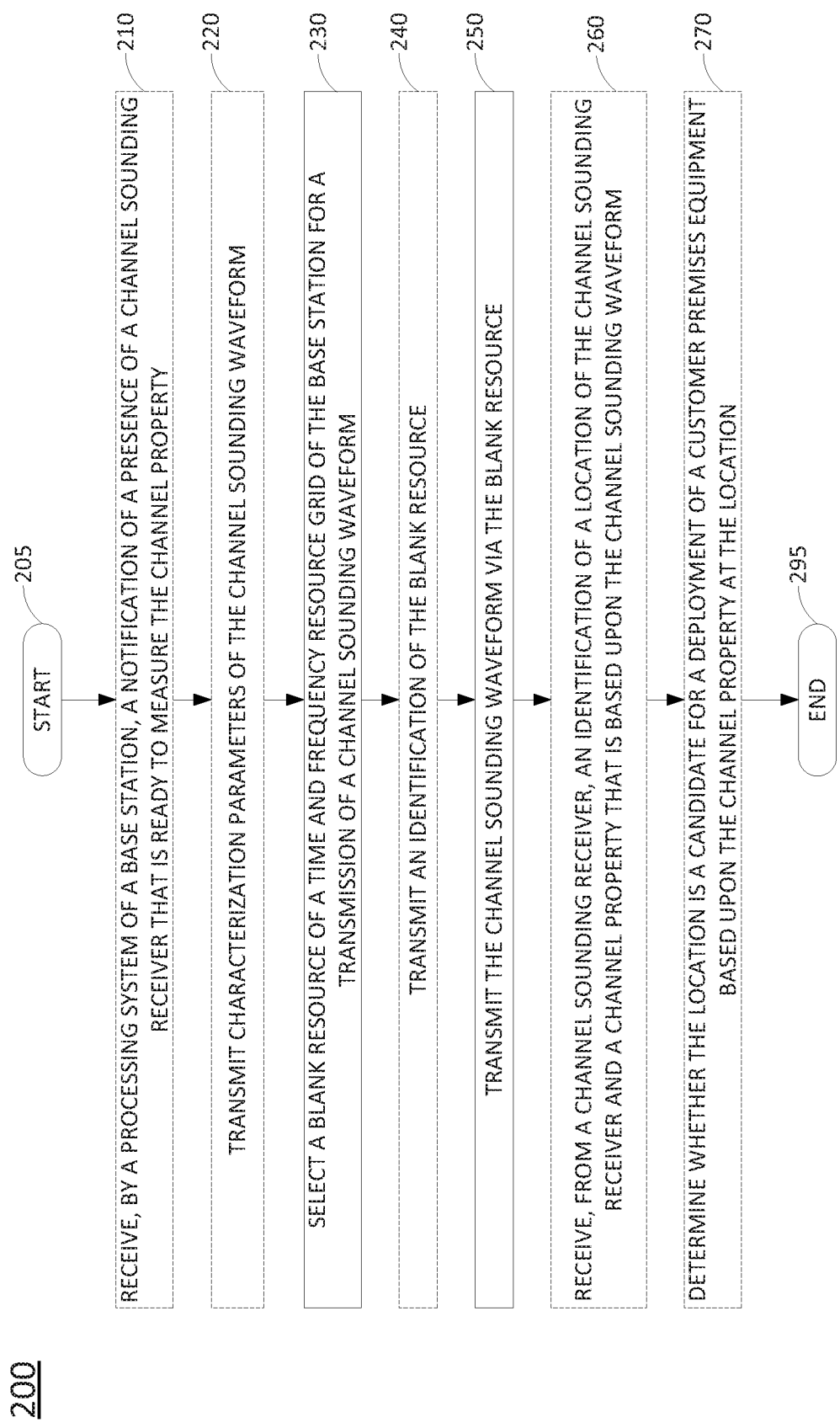
FIG. 2 illustrates a flowchart of a first example method for channel sounding via an in-service base station.

FIG. 2 illustrates a flowchart of an example method 200 for channel sounding via an in-service base station, in accordance with the present disclosure. In one example, steps, functions and/or operations of the method 200 may be performed by a device as illustrated in FIG. 1, e.g., a base station, or any one or more components thereof, such as a processing system, a processing system in conjunction with remote radio heads and/or antenna arrays, and so forth. In one example, the steps, functions, or operations of method 200 may be performed by a computing device or system 900, and/or a processing system 902 as described in connection with FIG. 9 below. For instance, the computing device 900 may represent at least a portion of a base station in accordance with the present disclosure. For illustrative purposes, the method 200 is described in greater detail below in connection with an example performed by a processing system, such as processing system 902. The method 200 begins in step 205 and may proceed to optional step 210, optional step 220, or step 230.

At optional step 210, the processing system (e.g., of a base station) may receive a notification of a presence of the channel sounding receiver that is ready to measure the channel property. In one example, the notification comprises an instruction to transmit the channel sounding waveform via the blank resource. In one example, the instruction includes characterization parameters of the channel sounding waveform. The characterization parameters may comprise at least one of: a sequence/pattern indication, a timing indication (e.g., periodicity, offset), a sub-band index, a transmission bandwidth, or a transmission power. In one example, the notification is received via at least one of: radio resource control signaling, preconfiguration signaling, or application layer signaling. In one example, the notification is received via out-of-band signaling. For example, a first portion of the base station may comprise 3GPP 5G infrastructure and a second portion of the base station comprises 3G, 4G, or 4G/LTE infrastructure. In addition, the channel sounding of the method 200 may be with respect to a 5G channel using the first portion of the base station. In such case, the out-of-band signaling may be using the second portion of the base station (e.g., 3G, 4G, or 4G/LTE infrastructure). The use of the previous generation cellular infrastructure (e.g., LTE) for signaling extends the measurement range beyond what would typically be used to support user data per 5G (e.g., millimeter wave frequencies for fixed wireless broadband (FWB) for example. In one example, the out-of-band signaling could also be through Wi-Fi or WiMAX (if the base station and channel sounding receiver are both so equipped).

At optional step 220, the processing system may transmit characterization parameters of the channel sounding waveform. The characterization parameters may comprise the same or similar characterization parameters as mentioned above in connection with optional step 210, such as at least one of: a sequence/pattern indication, a timing indication (e.g., periodicity, offset), a sub-band index, a transmission bandwidth, a transmission power, and so forth. The characterization parameters may be transmitted via radio resource control signaling, preconfiguration signaling, or application layer signaling. In one example, the characterization parameters may be transmitted via out-of-band signaling.

At step 230, the processing system selects a blank resource of a time and frequency resource grid of the base station for a transmission of a channel sounding waveform. In one example, the selecting is performed in response to the receiving the notification of the presence of the channel sounding receiver that is ready to measure the channel property. In one example, the blank resource comprises at least one time/frequency resource block that is reserved for forward compatibility or for legacy system usage within the time and frequency resource grid of the base station. In one example, the time/frequency resource block that is reserved for forward compatibility is not assigned to user data, control and signaling communications, or the like. Similarly, in one example, the time/frequency resource block that is reserved for legacy system usage may no longer be in use for legacy system(s), but is not currently assigned to user data, control and signaling communications, or the like. In one example, endpoint devices (e.g., user equipment (UE)) may be configured to avoid searching for control signals and communications in the time/frequency resource blocks that are designated as blank resources, to avoid requesting uplink or downlink reserved resources in the time/frequency resource blocks that are designated as blank resources, and so forth.

At optional step 240, the processing system may transmit an identification of the blank resource. The identification of the blank resource may be provided via radio resource control signaling, preconfiguration signaling, or application layer signaling. In one example, the identification of the blank resource may be transmitted via out-of-band signaling. The identification may be in any format which positively identifies the correct time-frequency resource block(s) of the time and frequency resource grid of the base station that comprise the blank resources on which the channel sounding waveform is to be transmitted. For instance, in one example, the identification may be in a form according to the specification of the considered wireless cellular communications standard (e.g., 3GPP 5G).

At step 250, the processing system transmits the channel sounding waveform via the blank resource. In one example, the selecting of step 230 and the transmitting of step 250 are performed in response to the receiving the notification of the presence of the channel sounding receiver that is ready to measure the channel property. In one example, when the channel sounding waveform is transmitted, the channel sounding waveform is non-aligned to the time and frequency resource grid. For instance, the transmission can disregard sub-carrier spacing, typical cyclic prefix(es), timing alignments, symbol length, etc. In one example, the channel sounding waveform comprises a Zadoff-Chu (ZC) sequence. In one example, the transmitting the channel sounding waveform comprises inserting the channel sounding waveform before an inverse fast Fourier transform stage of the base station.

At optional step 260, the processing system may receive, from the channel sounding receiver, an identification of a location of the channel sounding receiver and a channel property that is based upon the channel sounding waveform. For instance, the channel property measurement is associated with a location of the channel sounding receiver. In one example, the channel sounding receiver measures the channel property based upon the characterization parameters and the channel sounding waveform that is received. Various channel properties as described above may be measured by the channel sounding receiver and provided to the processing system at optional step 260. In one example, the channel sounding receiver may determine the location using a global position system (GPS) component that is attached to or deployed in within the channel sounding receiver. Alternatively, or in addition, the channel sounding receiver may determine the location using base station triangulation techniques, such as measuring time of arrival (ToA) of reference signals from different base stations, and so forth.

At optional step 270, the processing system may determine whether the location is a candidate for a deployment of a customer premises equipment (CPE) based upon the channel property at the location. For instance, the processing system may gather channel property measurements for various orientations of the channel sounding receiver at the location, from a variety of different locations within communication range of the base station, and so forth. Using these various channel property measurements, the processing system may therefore identify candidate locations (and/or orientations with respect to the alignment with one or more receive beams from base station) for deployment of a CPE. In one example, the CPE may comprise a receiver and/or transceiver for fixed mobile broadband (FMB) for example. In one example, the processing system may determine that the location is a candidate for deployment of a CPE if the channel property measurements meet a predetermined criteria (e.g., a threshold measured value of the channel property, a threshold score that accounts for the channel property and one or more additional channel properties), and so forth. In another example, the processing system may determine that the location is a candidate for deployment of a CPE if the channel property measurements indicate that the location is one of a top several locations for providing a best signal quality, a highest throughput, or the like as compared to other locations within communication range of the base station.

Following step 250, optional step 260, and/or optional step 270, the method 200 proceeds to step 295 where the method ends.

Figure 3:
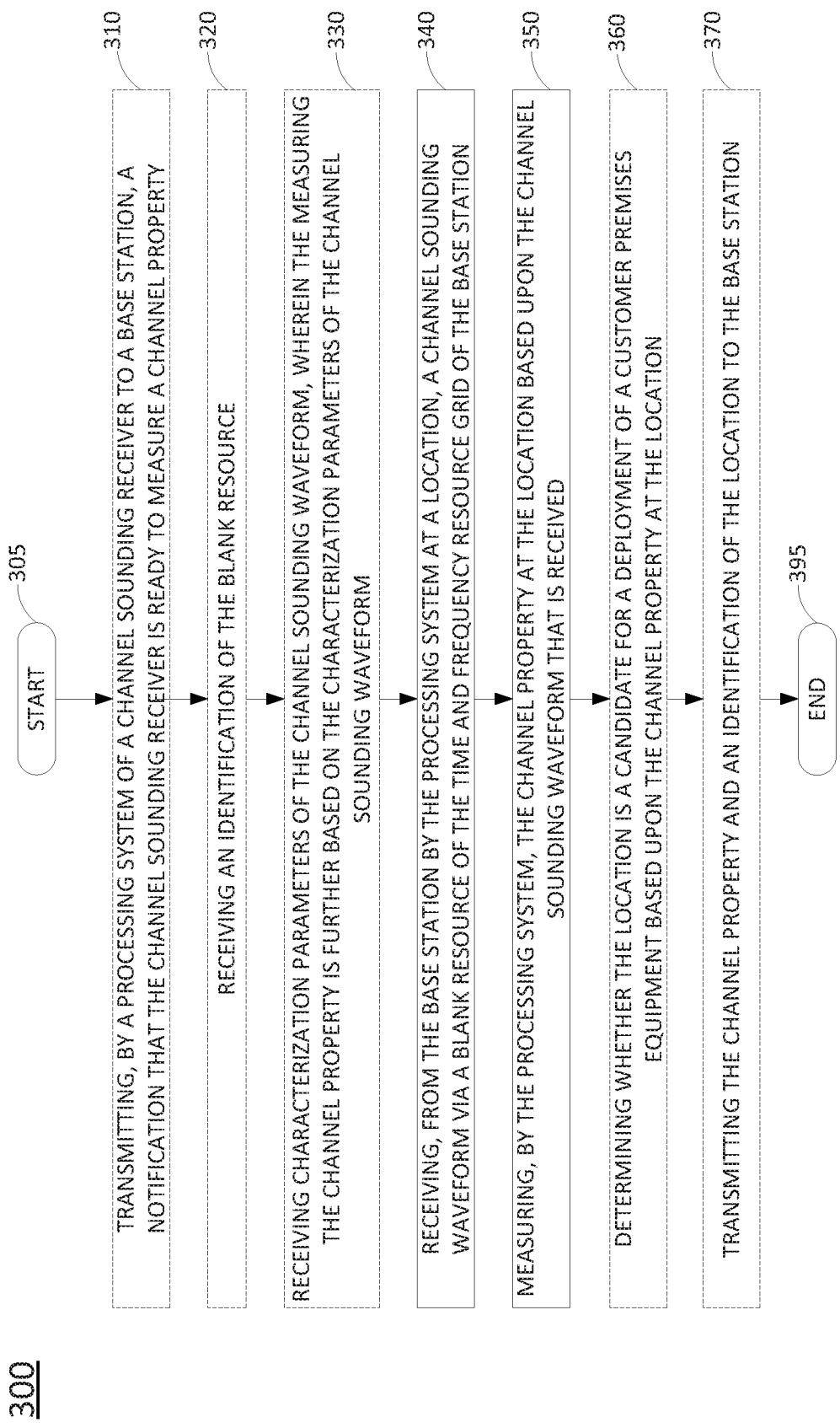
FIG. 3 illustrates a flowchart of a second example method for channel sounding via an in-service base station.

FIG. 3 illustrates a flowchart of an example method 300 for channel sounding via an in-service base station, in accordance with the present disclosure. In one example, steps, functions and/or operations of the method 300 may be performed by a device as illustrated in FIG. 1, e.g., a channel sounding receiver, a mobile endpoint device, and/or a UE, or any one or more components thereof, such as a processing system, a USB cellular dongle, a Global Positioning System (GPS) unit, an antenna array, and so forth. In one example, the steps, functions, or operations of method 300 may be performed by a computing device or system 900, and/or a processing system 902 as described in connection with FIG. 9 below. For instance, the computing device 900 may represent at least a portion of a channel sounding receiver in accordance with the present disclosure. For illustrative purposes, the method 300 is described in greater detail below in connection with an example performed by a processing system, such as processing system 902. The method 300 begins in step 305 and may proceed to any of optional steps 310-330, or to step 340.

At optional step 310, the processing system (e.g., of a channel sounding receiver) may transmit to a base station, a notification that the channel sounding receiver is ready to measure a channel property. The notification may include an instruction to transmit a channel sounding waveform via a blank resource. In one example, the instruction may further include characterization parameters of the channel sounding waveform. The characterization parameters may comprise the same or similar characterization parameters as mentioned above in connection with optional steps 210 of the example method 200. In one example, the notification is sent via at least one of: radio resource control signaling, preconfiguration signaling, or application layer signaling. In one example, the notification is sent via out-of-band signaling. For instance, the sending of the notification may be the same or similar to that which is described above in connection with optional step 210 of the example method 200.

At optional step 320, the processing system may receive an identification of the blank resource from the base station. The identification of the blank resource may be provided via radio resource control signaling, preconfiguration signaling, application layer signaling, and/or out-of-band signaling. The identification may be in any format which positively identifies the correct time-frequency resource block(s) of the time and frequency resource grid of the base station that comprise the blank resources on which the channel sounding waveform is to be transmitted. The receiving of the identification of the blank resource may be from the base station, which may transmit the identification of the blank resource in the same or a similar manner as described above in connection with step 240 of the example method 200.

At optional step 330, the processing system may receive characterization parameters of the channel sounding waveform. For instance, the processing system may use the characterization parameters in comparison to a received channel sounding waveform to determine one or more channel properties, e.g., at the following steps 340 and 350. The characterization parameters may be received (e.g., from the base station) in the same or a similar manner as the identification of the blank resource that may be received at optional step 320. In one example, the identification of the blank resource and the characterization parameters may be received in a same communication from the base station.

At step 340, the processing system receives, from the base station, at a location, a channel sounding waveform via the blank resource of the time and frequency resource grid of the base station. In one example, the processing system may tune an antenna receiver system to receive the channel sounding waveform via a predetermined pattern. For instance, the processing system may align a receiver with the frequency sub-carrier(s) at the time(s) corresponding to the blank resource(s), may steer a receiver gain pattern, and so forth.

At step 350, the processing system measures the channel property at the location based upon the channel sounding waveform that is received (and in one example, further based upon the characterization parameters). Various channel properties as described above may be measured by the channel sounding receiver. In one example, the channel sounding receiver may determine the location using a GPS component, using base station triangulation techniques, such as measuring time of arrival (ToA) of reference signals from different base stations, and so forth. In one example, the channel sounding receiver may also associate a channel property measurement with a particular orientation. For instance, the channel sounding receiver may include a gyroscope and compass, or the like, and may determine a particular orientation of a multi-path signal, may determine a direction of a maximum received signal strength, and so forth. The channel property may be associated with various layers of the receiver protocol stack. For instance, in one example, the channel property may be associated with the physical layer and does not require that the receiver decipher any particular bit pattern of the channel sounding waveform.

At optional step 360, the processing system may determine whether the location is a candidate for a deployment of a customer premises equipment based upon the channel property at the location. For instance, optional step 360 may comprise the same or similar operations as described above in connection with optional step 270 of the example method 200. In this case, however, the determination may be performed at the processing system of the channel sounding receiver.

At optional step 370, the processing system may transmit the channel property and an identification of the location to the base station. For instance, optional step 370 may comprise an alternative to optional step 360, where the system includes base station and/or network based processing of channel properties at various locations and/or orientations (e.g., to determine candidate locations and/or orientations of customer premises equipment).

Following step 350, optional step 360, and/or optional step 370, the method 300 proceeds to step 395 where the method ends.

Figure 4:
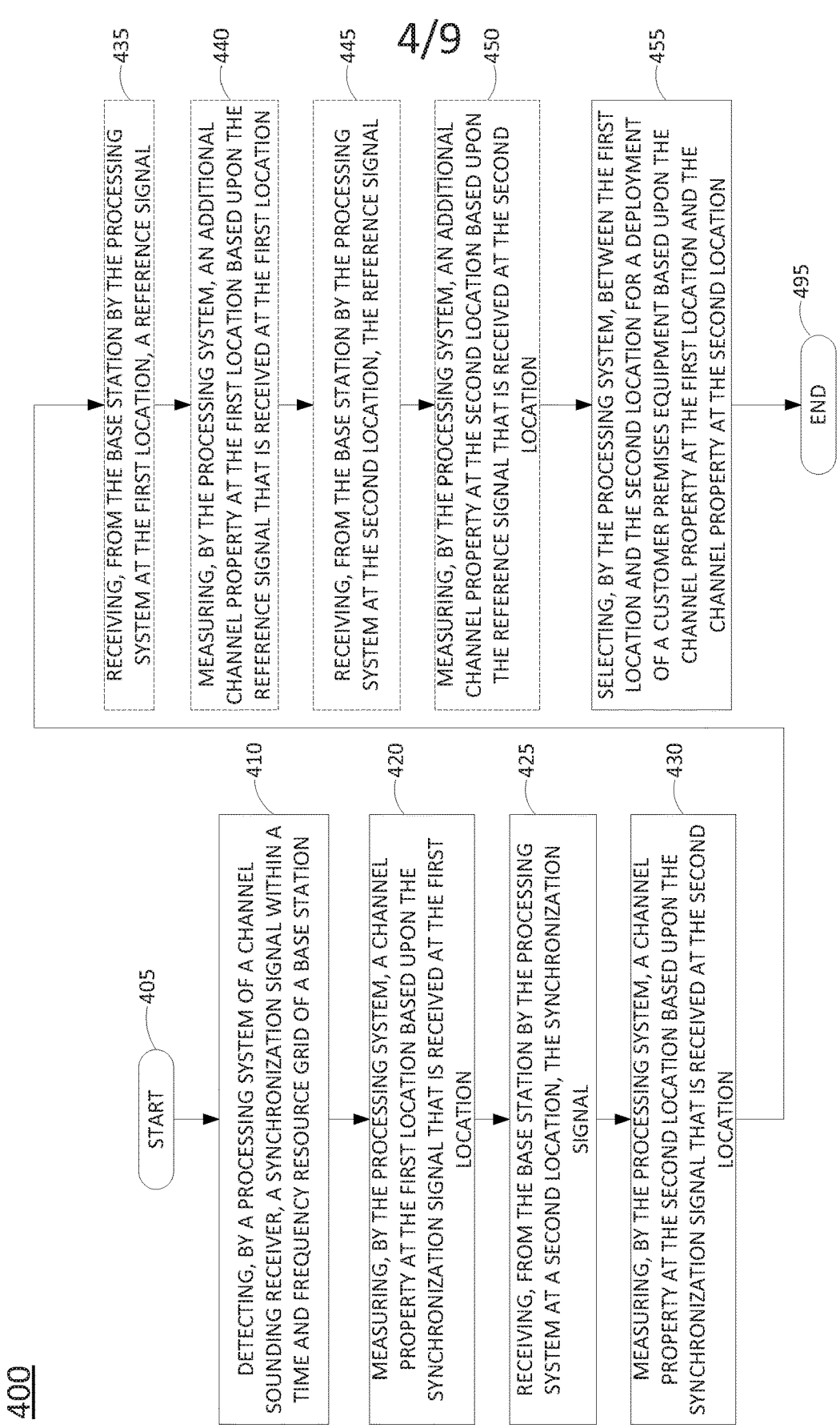
FIG. 4 illustrates a flowchart of a third example method for channel sounding via an in-service base station.

FIG. 4 illustrates a flowchart of an example method 400 for channel sounding via an in-service base station, in accordance with the present disclosure. In one example, steps, functions and/or operations of the method 400 may be performed by a device as illustrated in FIG. 1, e.g., a channel sounding receiver, a mobile endpoint device, and/or a UE, or any one or more components thereof. In one example, the steps, functions, or operations of method 400 may be performed by a computing device or system 900, and/or a processing system 902 as described in connection with FIG. 9 below. For instance, the computing device 900 may represent at least a portion of a channel sounding receiver in accordance with the present disclosure. For illustrative purposes, the method 400 is described in greater detail below in connection with an example performed by a processing system, such as processing system 902. The method 400 begins in step 405 and proceeds to step 410.

At step 410, the processing system detects a synchronization signal within a time and frequency resource grid of a base station. For example, the synchronization signal may comprise: a primary synchronization signal, a secondary synchronization signal, or a physical broadcast channel (PBCH). It should be noted that the PBCH may be considered a "synchronization signal" in accordance with the present disclosure since, in one example, the PBCH can be part of the SS block. In one example, the detecting may comprise blind detection during an initial access procedure by the channel sounding receiver. It should be noted that this example does not require any changes to the base station. In other examples, the detecting may be via an explicit indication from the base station via higher layer signaling, e.g., RRC, by preconfiguration, or by out-of-band communication.

At step 420, the processing system measures a channel property at the first location based upon the synchronization signal that is received at the first location. In one example, step 410 may include receiving multiple synchronization signals, and step 420 may correspondingly include measuring the channel property for multiple synchronization signals. In addition, the receiving and measuring may be performed over multiple SS bursts (e.g., for as many bursts as the channel sounding receiver selects, for as many antenna ports as the channel sounding receiver wants to obtain measurements, for as many SS sweeps of the base station as the channel sounding receiver is configured or programmed to wait for, and so on).

At step 425, the processing system receives, at a second location, the synchronization signal from the base station. Step 425 may comprise the same or similar operations as step 410, albeit with respect to the second location.

At step 430, the processing system measures the channel property at the second location based upon the synchronization signal that is received at the second location. Step 430 may comprise the same or similar operations as step 420. In one example, the measuring the channel property at the first location per step 420 comprises measuring a plurality of channel properties at the first location, and the measuring the channel property at the second location per step 430 comprises measuring the plurality of channel properties at the second location. For instance, in one example, the plurality of channel properties comprises at least two of: path loss, material loss, angular spread, or Doppler spread. The channel property or properties measured at steps 420 and 430 may include a variety of other channel properties as described herein.

At optional step 435, the processing system may receive, from the base station by the processing system at the first location, a reference signal. The reference signal may comprise, for example, a positioning reference signal (PRS) or a channel state information reference signal (CSI-RS).

At optional step 440, the processing system may measure an additional channel property at the first location based upon the reference signal that is received at the first location. In one example, step 440 may also include receiving multiple reference signals and measuring one or more channel properties based upon the multiple reference signals.

At optional step 445, the processing system may receive, from the base station by the processing system at the second location, the reference signal. It should be noted that the reference signal received at optional step 445 may comprise a different base station transmission at a different time as the reference signal received at optional step 335. However, the reference signal may have the same properties (e.g., the same characterization parameters) as the reference signal received at optional step 435. Hence, with respect to optional step 445 it is referred to as the same reference signal. Similarly, optional step 445 may comprise receiving multiple reference signals at the second location.

At optional step 450, the processing system may measure the additional channel property at the second location based upon the reference signal that is received at the second location. It should be noted that the additional channel property that is measured at optional step 450 is the same "additional channel property" that is measured at optional step 440.

At step 455, the processing system selects between the first location and the second location for a deployment of a customer premises equipment based upon the channel property at the first location and the channel property at the second location. In one example, the selecting between the first location and the second location for the deployment of the customer premises equipment is based upon the plurality of channel properties at the first location and the plurality of channel properties at the second location. In one example, the selecting between the first location and the second location for the deployment of the customer premises equipment is further based upon the additional channel property at the first location and the additional channel property at the second location (e.g., that are measured at optional steps 440 and 450 with respect to the reference signal). In one example, step 455 may comprise similar operations to that which is described above in connection with optional step 360 of the example method 300.

Following step 455, the method 400 proceeds to step 495 where the method ends.

Figure 5:
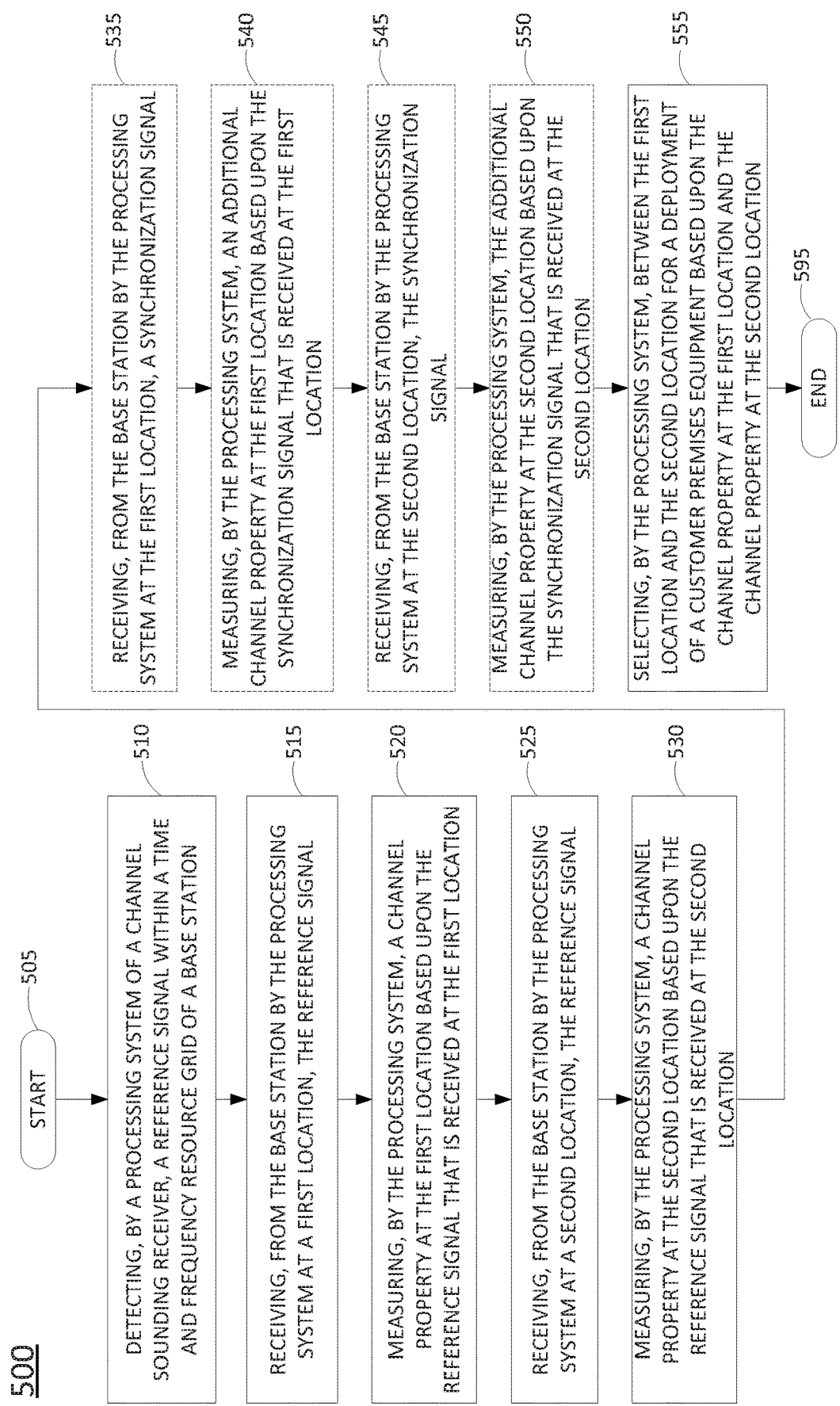
FIG. 5 illustrates a flowchart of a fourth example method for channel sounding via an in-service base station.

FIG. 5 illustrates a flowchart of an example method 500 for channel sounding via an in-service base station, in accordance with the present disclosure. In one example, steps, functions and/or operations of the method 500 may be performed by a device as illustrated in FIG. 1, e.g., a channel sounding receiver, a mobile endpoint device, and/or a UE, or any one or more components thereof. In one example, the steps, functions, or operations of method 500 may be performed by a computing device or system 900, and/or a processing system 902 as described in connection with FIG. 9 below. For instance, the computing device 900 may represent at least a portion of a channel sounding receiver in accordance with the present disclosure. For illustrative purposes, the method 500 is described in greater detail below in connection with an example performed by a processing system, such as processing system 902. The method 500 begins in step 505 and proceeds to step 510.

At step 510, a processing system (e.g., of a channel sounding receiver) detects a reference signal within a time and frequency resource grid of a base station. The reference signal may comprise, for example, a positioning reference signal (PRS) or a channel state information reference signal (CSI-RS). In one example, the detecting may comprise blind detection during an initial access procedure by the channel sounding receiver. It should be noted that this example does not require any changes to the base station. In other examples, the detecting may be via an explicit indication from the base station via higher layer signaling, e.g., RRC, by preconfiguration, or by out-of-band communication.

At step 515, the processing system receives, at a first location from the base station, the reference signal. In one example, the processing system may receive multiple reference signals at the first location from the base station. In one example, steps 510 and/or 515 may comprise the same or similar operations as described above in connection with optional step 435 of the example method 400.

At step 520, the processing system measures a channel property at the first location based upon the reference signal that is received at the first location (or a plurality of channel properties based upon the reference signal, or multiple reference signals). In one example, step 520 may comprise the same or similar operations as described above in connection with optional step 440 of the example method 400.

At step 525, the processing system receives, at a second location from the base station, the reference signal. Step 525 may comprise the same or similar operations as step 515, albeit with respect to the second location.

At step 530, the processing system measures the channel property at the second location based upon the reference signal(s) that is/are received at the second location. Step 530 may comprise the same or similar operations as step 520, albeit with respect to the second location.

At optional step 535, the processing system may receive at the first location from the base station, a synchronization signal. In one example, optional step 535 may comprise the same or similar operations as described above in connection with step 410 of the example method 400.

At optional step 540, the processing system may measure an additional channel property at the first location based upon the synchronization signal that is received at the first location. In one example, optional step 540 may comprise the same or similar operations as described above in connection with step 420 of the example method 400.

At optional step 545, the processing system may receive at the second location from the base station, the synchronization signal. Optional step 545 may comprise the same or similar operations as step 535, albeit with respect to the second location.

At optional step 550, the processing system may measure the additional channel property at the second location based upon the synchronization signal that is received at the second location. Optional step 550 may comprise the same or similar operations as step 540, albeit with respect to the second location.

At step 555, the processing system selects between the first location and the second location for a deployment of a customer premises equipment based upon the channel property at the first location and the channel property at the second location. In one example, the selecting between the first location and the second location for the deployment of the customer premises equipment is based upon the plurality of channel properties at the first location and the plurality of channel properties at the second location. In one example, the selecting between the first location and the second location for the deployment of the customer premises equipment is further based upon the additional channel property at the first location and the additional channel property at the second location (e.g., that are measured at optional steps 540 and 550 with respect to the synchronization signal). In one example, step 555 may comprise similar operations to that which is described above in connection with step 455 of the example method 400, and/or optional step 360 of the example method 300.

Following step 555, the method 500 proceeds to step 595 where the method ends.

FIG. 6 illustrates a flowchart of an example method 600 for channel sounding via an in-service base station, in accordance with the present disclosure. In one example, steps, functions and/or operations of the method 600 may be performed by a device as illustrated in FIG. 1, e.g., a base station, or any one or more components thereof. In one example, the steps, functions, or operations of method 600 may be performed by a computing device or system 900, and/or a processing system 902 as described in connection with FIG. 9 below. For instance, the computing device 900 may represent at least a portion of a base station in accordance with the present disclosure. For illustrative purposes, the method 600 is described in greater detail below in connection with an example performed by a processing system, such as processing system 902. The method 600 begins in step 605 and proceeds to step 610.

At step 610, the processing system (e.g., of a base station) transmits a channel state information reference signal (CSI-RS) via a transmit beam that is selected based upon a transmit beam selection optimization for a first endpoint device (e.g., a UE). The transmit beam selection optimization may be based upon an indication from the first endpoint device of a preferred transmit beam. In one example, the communication from the first endpoint device may comprise an uplink signaling communication in accordance with a beam management procedure defined in the specification of the considered wireless cellular communications standard (e.g., 3GPP 5G).

At step 620, the processing system receives a notification of a presence of a channel sounding receiver that is available to perform a measurement of a channel property. The receiving of the notification at step 620 may comprise the same or similar operations as described above in connection with optional step 210 of the example method 200.

At step 630, the processing system transmits, in response to the presence of the channel sounding receiver, the channel state information reference signal (CSI-RS) via a beam swept transmission. It should be noted that in accordance with the example method 600, a general mode of operation for the base station may comprise transmissions of CSI-RS using beam selection. However, for purposes of wireless channel sounding, step 630 may comprise changing the base station to a mode of operation where CSI-RS is specifically transmitted via beam sweeping.

At optional step 640, the processing system may receive from the channel sounding receiver, an identification of a location of the channel sounding receiver and a channel property measurement that is based upon the channel state information reference signal (CSI-RS). For example, the channel sounding receiver may measure one or more channel properties using the CSI-RS as a channel sounding waveform. The one or more channel properties may comprise any of the channel properties described above in connection with various examples. In one example, a channel property measured at optional step 640 may comprise a multiple-input multiple-output (MIMO) measure or a delay spread measure.

At optional step 650 the processing system may determine whether the location is a candidate for a deployment of a customer premises equipment based upon the channel property at the location. For instance, optional step 650 may comprise the same or similar operations as described above in connection with optional step 270 of the example method 200. However, it should be noted that in another example where optional steps 640 and 650 are omitted, the channel sounding receiver may measure the channel property based upon the channel state information reference signal and determine whether a location of the channel sounding receiver is a candidate for a deployment of a customer premises equipment based upon the channel property at the location. It should also be noted that following the channel property measurements in accordance with the method 600, the processing system may switch the base station back to a mode of operation where CSI-RS is again transmitted to endpoint devices (e.g., non-channel sounding UE) via a transmit beam selection optimization procedure.

Following step 630, optional step 640, and/or optional step 650, the method 600 proceeds to step 695 where the method ends.

Figure 7:
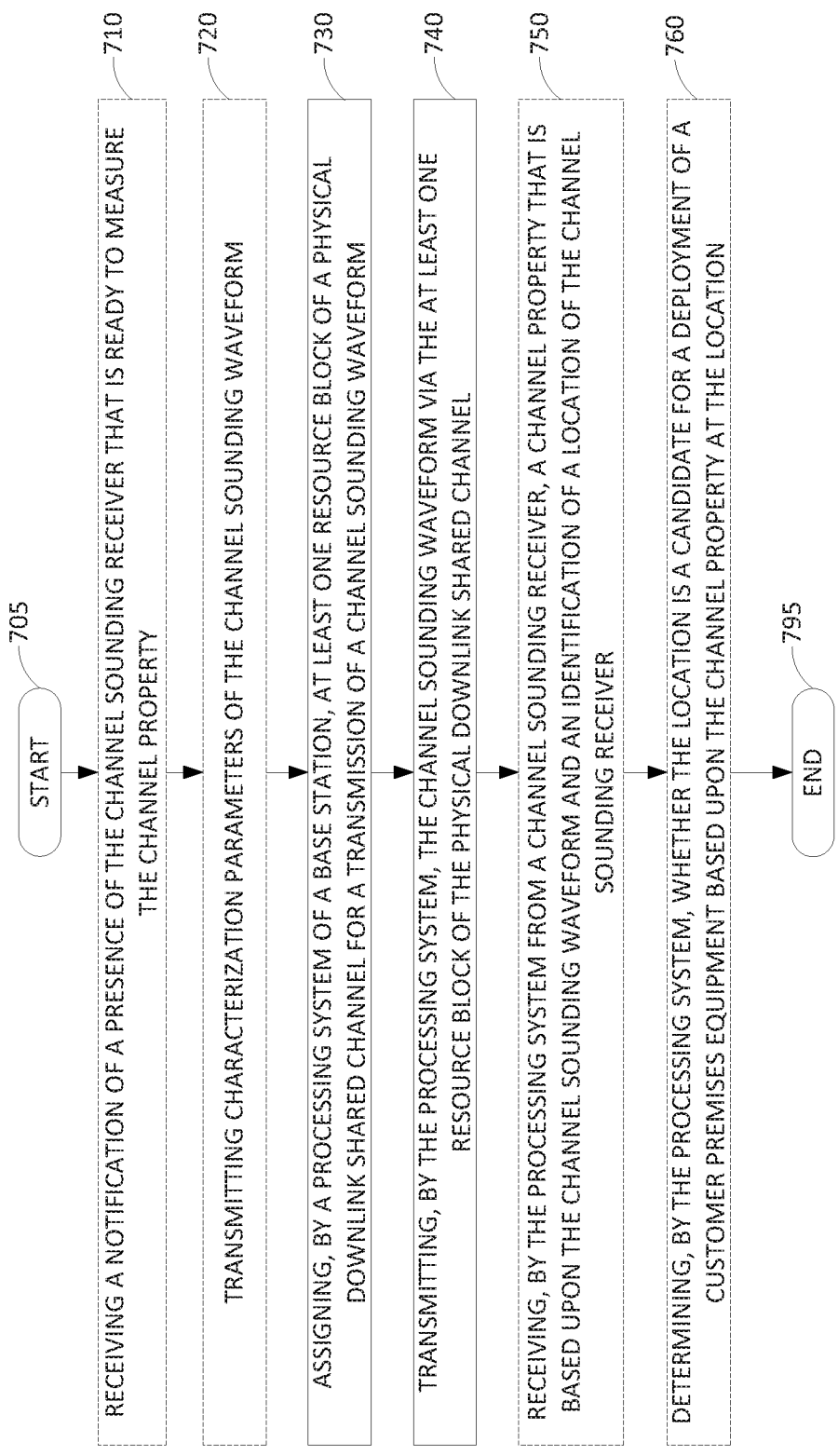
FIG. 7 illustrates a flowchart of a sixth example method for channel sounding via an in-service base station.

FIG. 7 illustrates a flowchart of an example method 700 for channel sounding via an in-service base station, in accordance with the present disclosure. In one example, steps, functions and/or operations of the method 700 may be performed by a device as illustrated in FIG. 1, e.g., a base station, or any one or more components thereof. In one example, the steps, functions, or operations of method 700 may be performed by a computing device or system 900, and/or a processing system 902 as described in connection with FIG. 9 below. For instance, the computing device 900 may represent at least a portion of a base station in accordance with the present disclosure. For illustrative purposes, the method 700 is described in greater detail below in connection with an example performed by a processing system, such as processing system 902. The method 700 begins in step 705 and may proceed to optional step 710, optional step 720, or step 730.

At optional step 710, the processing system (e.g., of a base station) may receive a notification of a presence of the channel sounding receiver that is ready to measure the channel property. In one example, the notification comprises an instruction to transmit the channel sounding waveform via the at least one resource block of the physical downlink shared channel. In one example, the at least one resource block comprises at least one time/frequency resource block of a time and frequency resource grid implemented at the base station. In one example, the instruction includes characterization parameters of the channel sounding waveform. In one example, the characterization parameters may comprise at least one of: a resource mapping (which may include a resource block assignment, periodicity, timing, frequency hopping, etc.), a bit sequence, a code rate, a redundancy version, a modulation level, a precoding matrix indicator, or a precoder cycling pattern. The characterization parameters can also include a sub-band index, a transmission bandwidth, a transmission power, and so on. In one example, the notification is received via at least one of: radio resource control signaling, preconfiguration signaling, or application layer signaling. In one example, the notification is received via out-of-band signaling. Optional step 710 may comprise similar operations to that which is described above in connection with optional step 210 of the example method 200.

At optional step 720, the processing system may transmit characterization parameters of the channel sounding waveform. In one example, the characterization parameters may comprise the same or similar characterization parameters as described above in connection with optional step 710. In one example, for the transmitting the channel sounding waveform via the method 700, a modulation coding scheme of the physical downlink shared channel is set to one of: a binary phase shift keying modulation coding scheme, a quadrature phase shift keying modulation coding scheme, a modulation coding scheme based upon a precoding matrix indicator, or a modulation coding scheme based upon precoder cycling. It should be noted that in one example, a channel sounding process of the method 700 is controlled by the channel sounding receiver, while in another example, the channel sounding process is controlled by the base station processing system. Thus, in one example, characterization parameters, such as a modulation coding scheme, may be selected by the channel sounder receiver and included in the characterization parameters of the notification of step 710, or may be selected by the base station processing system and transmitted as characterization parameters at optional step 720.

At step 730, the processing system of the base station assigns at least one resource block of a physical downlink shared channel for a transmission of a channel sounding waveform. As mentioned above, the at least one resource block may comprise at least one time/frequency resource block of a time and frequency resource grid implemented at the base station. In one example, the resource block may be selected by the channel sounding receiver and included in instructions at optional step 710. In such an example, the processing system (of the base station) may assign the at least one resource block in accordance with the instruction.

At step 740, the processing system transmits the channel sounding waveform via the at least one resource block of the physical downlink shared channel. In the example, the assigning of step 730 and the transmitting of step 740 are performed in response to the receiving the notification of the presence of the channel sounding receiver that is ready to measure the channel property. In one example, when the channel sounding waveform is transmitted, the channel sounding waveform is aligned to the time and frequency resource grid. In various examples, the transmitting the channel sounding waveform via the physical downlink shared channel may comprise: setting a payload of a media access control protocol data unit to a predetermined bit sequence associated with the channel sounding waveform, setting a payload of a radio link control protocol data unit to a predetermined bit sequence associated with the channel sounding waveform, or setting a payload of a packet data convergence protocol (PDCP) protocol data unit (PDU) to a predetermined bit sequence associated with the channel sounding waveform.

At optional step 750, the processing system may receive, from the channel sounding receiver, a channel property that is based upon the channel sounding waveform and an identification of a location of the channel sounding receiver. For instance, the channel sounding receiver may measure the channel property based upon the characterization parameters and the channel sounding waveform that is received. The obtaining of the measurements and a determination of the location may comprise the same or similar operations as described above in connection with step 350 of the example method 300.

At optional step 760, the processing system may determine whether the location is a candidate for a deployment of a customer premises equipment based upon the channel property at the location. For instance, in one example the channel property is associated with the location of the channel sounding receiver. Thus the channel property (or multiple channel properties) for the location may be compared to channel property measurements for other locations and/or other orientations to determine whether the location is suitable for deployment of a customer premises equipment. In one example optional step 760 may comprise the same or similar operations as optional step 270 of the example method 200.

Following step 740, optional step 750, or optional step 760, the method 700 proceeds to step 795 where the method ends.

Figure 8:
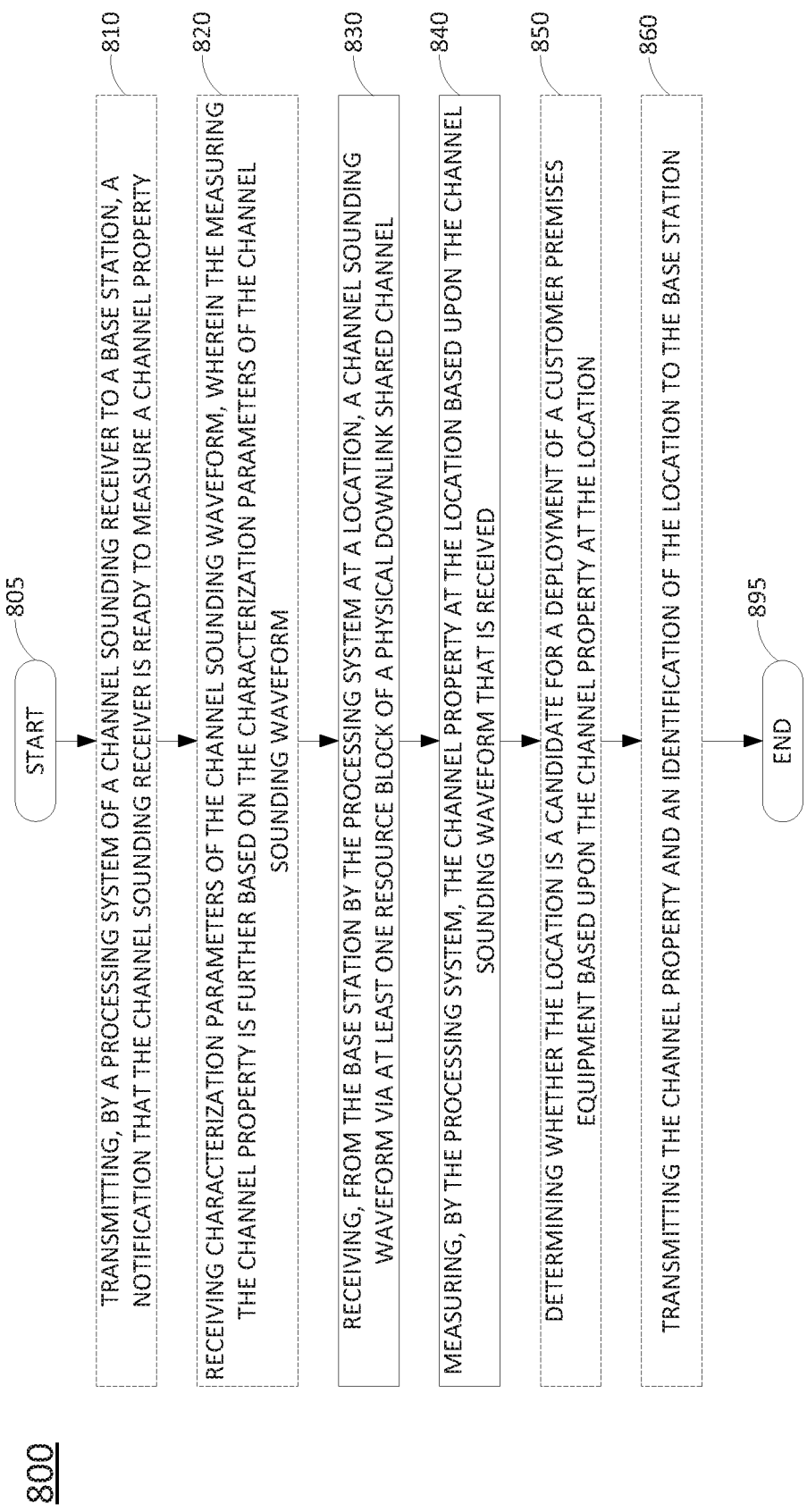
FIG. 8 illustrates a flowchart of a seventh example method for channel sounding via an in-service base station.

FIG. 8 illustrates a flowchart of an example method 800 for channel sounding via an in-service base station, in accordance with the present disclosure. In one example, steps, functions and/or operations of the method 800 may be performed by a device as illustrated in FIG. 1, e.g., a channel sounding receiver, a mobile endpoint device, and/or a UE, or any one or more components thereof. In one example, the steps, functions, or operations of method 800 may be performed by a computing device or system 900, and/or a processing system 902 as described in connection with FIG. 9 below. For instance, the computing device 900 may represent at least a portion of a channel sounding receiver in accordance with the present disclosure. For illustrative purposes, the method 800 is described in greater detail below in connection with an example performed by a processing system, such as processing system 902. The method 800 begins in step 805 and may proceed to optional step 810, optional step 820, or step 830.

At optional step 810, the processing system (e.g., of a channel sounding receiver) may transmit to a base station a notification that the channel sounding receiver is ready to measure a channel property. In one example, the notification comprises an instruction to transmit the channel sounding waveform via the at least one resource block of the physical downlink shared channel. In one example, the at least one resource block comprises at least one time/frequency resource block of a time and frequency resource grid implemented at the base station. In one example, the instruction includes characterization parameters of the channel sounding waveform. It should be noted that step 810 may comprise the same or similar operations as described above with respect to optional step 310 of the example method 300.

At optional step 820, the processing system may receive, from the base station, characterization parameters of the channel sounding waveform. In one example, the characterization parameters may comprise at least one of: a resource mapping (which may include a resource block assignment, periodicity, timing, frequency hopping, etc.), a bit sequence, a code rate, a redundancy version, a modulation level, a precoding matrix indicator, or a precoder cycling pattern (which can also include a sub-band index, a transmission bandwidth, a transmission power), and so forth.

In one example, for the receiving of the channel sounding waveform via the method 800, a modulation coding scheme of the physical downlink shared channel is set to one of: a binary phase shift keying modulation coding scheme, a quadrature phase shift keying modulation coding scheme, a modulation coding scheme based upon a precoding matrix indicator, or a modulation coding scheme based upon precoder cycling. It should be noted that in one example, a channel sounding process is controlled by the channel sounding receiver, while in another example, the channel sounding process is controlled by the base station processing system. Thus, in one example, characterization parameters, such as a modulation coding scheme, may be selected by the channel sounder receiver and included in the characterization parameters of the notification of step 810, or may be selected by the base station processing system and received as characterization parameters at optional step 820.

At step 830, the processing system receives, from the base station, at a location, a channel sounding waveform via at least one resource block of a physical downlink shared channel (PDSCH). In one example, the at least one resource block comprises at least one time/frequency resource block of a time and frequency resource grid implemented at the base station. In one example, the channel sounding waveform is aligned to the time and frequency resource grid of the base station. In various examples, the base station may transmit the channel sounding waveform via the physical downlink shared channel by: setting a payload of a media access control protocol data unit to a predetermined bit sequence associated with the channel sounding waveform, setting a payload of a radio link control protocol data unit to a predetermined bit sequence associated with the channel sounding waveform, or setting a payload of a packet data convergence protocol (PDCP) protocol data unit (PDU) to a predetermined bit sequence associated with the channel sounding waveform.

However, it should be noted that at step 830 the processing system of the channel sounding receiver may receive and decode the channel sounding waveform at different layers of the protocol stack, e.g., depending upon the particular channel property, or channel properties to be measured. For instance, in one example, step 830 may not include the actual deciphering of the bit sequence. In one example, the channel sounding waveform is received having a modulation coding scheme comprising one of: a binary phase shift keying modulation coding scheme, a quadrature phase shift keying modulation coding scheme, a modulation coding scheme based upon a precoding matrix indicator, or a modulation coding scheme based upon precoder cycling. In one example, the modulation coding scheme may be provided as part of the characterization parameters sent at optional step 810 or received at optional step 820.

At step 840, the processing system measures the channel property at the location based upon the channel sounding waveform that is received. In one example, the measuring of the channel property is further based on the characterization parameters of the channel sounding waveform (which may be sent as part of the notification at optional step 810, or received at optional step 820 from the base station). For instance, in one example the measurement of the channel property is associated with the location of the channel sounding receiver. In one example, step 840 may comprise the same or similar operations as described above in connection with step 350 of the example method 300.

At optional step 850, the processing system may determine whether the location is a candidate for a deployment of a customer premises equipment based upon the channel property at the location. For instance, step 850 may comprise the same or similar operations as described above in connection with step 360 of the example method 300.

At optional step 860, the processing system may transmit the channel property and an identification of the location to the base station. For instance, in one example, a channel sounding process according to the method 800 may be controlled by a base station. In such an example, the channel sounding receiver may receive the channel sounding waveform and measure the channel property or properties, but the determination of whether location is a candidate for a deployment of a customer premises equipment based upon the channel property at the location may be performed instead by the base station (or other network-based devices). Thus, optional step 860 may comprise an alternative to optional step 850.

Following step 840, optional step 850 or optional step 860, the method 800 proceeds to step 895 where the method ends.

It should be noted that any of the methods 200-800 may be expanded to include additional steps or may be modified to include additional operations with respect to the steps outlined above. For example, the respective methods 200-800 may be repeated through various cycles of channel property measurements. In addition, aspects of any one or more of methods 200-800 may be combined to provide an expanded method. For instance, a base station processing system may perform operations in accordance with the method 200, the method 600, and/or the method 700. Similarly, a processing system of a channel sounding receiver may perform operations in accordance with the method 300, the method 400, and/or the method 800.

In addition, although not specifically specified, one or more steps, functions or operations of the respective methods 200-800 may include a storing, displaying and/or outputting step as required for a particular application. In other words, any data, records, fields, and/or intermediate results discussed in the method can be stored, displayed and/or outputted either on the device executing the method or to another device, as required for a particular application. Furthermore, steps, blocks, functions or operations in any of FIGS. 2-8 that recite a determining operation or involve a decision do not necessarily require that both branches of the determining operation be practiced. In other words, one of the branches of the determining operation can be deemed as an optional step. Furthermore, steps, blocks, functions or operations of the above described method(s) can be combined, separated, and/or performed in a different order from that described above, without departing from the example examples of the present disclosure.

Figure 9:
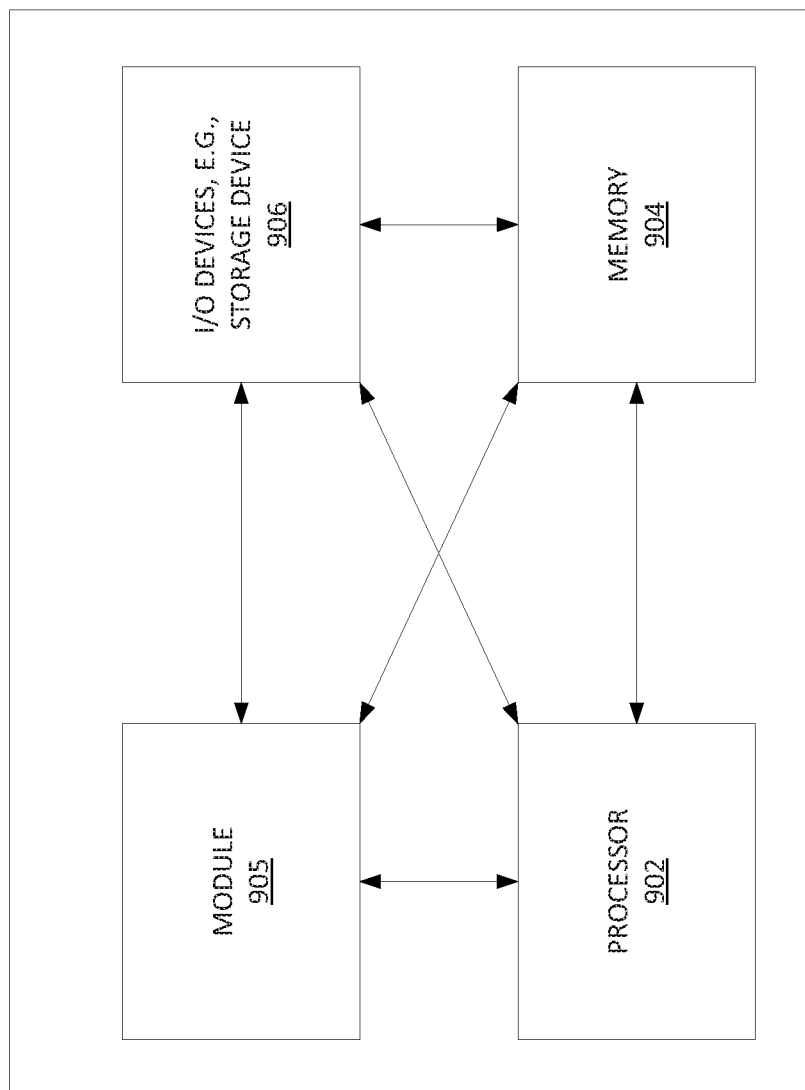
FIG. 9 illustrates an example of a computing device, or computing system, specifically programmed to perform the steps, functions, blocks, and/or operations described herein.

FIG. 9 depicts a high-level block diagram of a computing device or processing system specifically programmed to perform the functions described herein. As depicted in FIG. 9, the processing system 900 comprises one or more hardware processor elements 902 (e.g., a central processing unit (CPU), a microprocessor, or a multi-core processor), a memory 904 (e.g., random access memory (RAM) and/or read only memory (ROM)), a module 905 for channel sounding via an in-service base station, and various input/output devices 906 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 906 may also include antenna elements, antenna arrays, remote radio heads (RRHs), baseband units (BBUs), transceivers, power units, and so forth. Although only one processor element is shown, it should be noted that the computing device may employ a plurality of processor elements. Furthermore, although only one computing device is shown in the figure, if any one or more of the methods 200-800 as discussed above is implemented in a distributed or parallel manner for a particular illustrative example, i.e., the steps of the above methods 200-800, respectively, or each of the entire methods 200-800, respectively, is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 902 can also be configured or programmed to cause other devices to perform one or more operations as discussed above. In other words, the hardware processor 902 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed methods 200-800. In one example, instructions and data for the present module or process 905 for channel sounding via an in-service base station (e.g., a software program comprising computer-executable instructions) can be loaded into memory 904 and executed by hardware processor element 902 to implement the steps, functions or operations as discussed above in connection with the illustrative methods 200-800. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 905 for channel sounding via an in-service base station (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
   detecting, by a processing system of a channel sounding receiver, a synchronization signal within a time and frequency resource grid of a base station;
   measuring, by the processing system, a plurality of channel properties at a first physical location based upon the synchronization signal that is received at the first physical location, wherein the plurality of channel properties comprises at least two of: a path loss, a material loss, or an angular spread;
   receiving, from the base station by the processing system at a second physical location, the synchronization signal;
   measuring, by the processing system, the plurality of channel properties at the second physical location based upon the synchronization signal that is received at the second physical location; and
   selecting, by the processing system, between the first physical location and the second physical location for a deployment of a customer premises equipment based upon the plurality of channel properties at the first physical location and the plurality of channel properties at the second physical location.

2. The method of claim 1, wherein the synchronization signal comprises:
   a primary synchronization signal;
   a secondary synchronization signal; or
   a physical broadcast channel.

3. The method of claim 1, wherein the plurality of channel properties further comprises a doppler spread.

4. The method of claim 1, further comprising:
   receiving, from the base station by the processing system at the first physical location, a reference signal;
   measuring, by the processing system, an additional channel property at the first physical location based upon the reference signal that is received at the first physical location;
   receiving, from the base station by the processing system at the second physical location, the reference signal; and
   measuring, by the processing system, an additional channel property at the second physical location based upon the reference signal that is received at the second physical location.

5. The method of claim 4, wherein the reference signal comprises:
   a positioning reference signal; or
   a channel state information reference signal.

6. The method of claim 4, wherein the selecting between the first physical location and the second physical location for the deployment of the customer premises equipment is further based upon the additional channel property at the first physical location and the additional channel property at the second physical location.

7. A method comprising:
   detecting, by a processing system of a channel sounding receiver, a beam-swept reference signal within a time and frequency resource grid of a base station;
   measuring, by the processing system, a channel property at a first physical location based upon the beam-swept reference signal that is received at the first physical location;
   receiving, from the base station by the processing system at a second physical location, the beam-swept reference signal;
   measuring, by the processing system, a channel property at the second physical location based upon the beam-swept reference signal that is received at the second physical location; and
   selecting, by the processing system, between the first physical location and the second physical location for a deployment of a customer premises equipment based upon the channel property at the first physical location and the channel property at the second physical location.

8. The method of claim 7, wherein the beam-swept reference signal comprises:
a positioning reference signal that is beam-swept.

9. The method of claim 7, wherein the beam-swept reference signal comprises:
a channel state information reference signal that is beam-swept.

10. A device comprising:
a processor; and
a computer-readable storage medium storing instructions which, when executed by the processor, cause the processor to perform operations, the operations comprising:
detecting a synchronization signal within a time and frequency resource grid of a base station;
measuring a plurality of channel properties at a first physical location based upon the synchronization signal that is received at the first physical location, wherein the plurality of channel properties comprises at least two of: a path loss, a material loss, or an angular spread;
receiving, from the base station at a second physical location, the synchronization signal;
measuring the plurality of channel properties at the second physical location based upon the synchronization signal that is received at the second physical location; and
selecting between the first physical location and the second physical location for a deployment of a customer premises equipment based upon the plurality of channel properties at the first physical location and the plurality of channel properties at the second physical location.

11. The device of claim 10, wherein the synchronization signal comprises:
a primary synchronization signal;
a secondary synchronization signal; or
a physical broadcast channel.

12. The device of claim 10, wherein the plurality of channel properties further comprises a doppler spread.

13. The device of claim 10, the operations further comprising:
receiving, from the base station, at the first physical location, a reference signal;
measuring an additional channel property at the first physical location based upon the reference signal that is received at the first physical location;
receiving, at the second physical location, from the base station, the reference signal; and
measuring an additional channel property at the second physical location based upon the reference signal that is received at the second physical location.

14. The device of claim 13, wherein the reference signal comprises:
a positioning reference signal; or
a channel state information reference signal.

15. The device of claim 13, wherein the selecting between the first physical location and the second physical location for the deployment of the customer premises equipment is further based upon the additional channel property at the first physical location and the additional channel property at the second physical location.

* * * * *